(12) United States Patent
Chiu

(10) Patent No.: US 8,407,549 B2
(45) Date of Patent: Mar. 26, 2013

(54) METHOD FOR OPERATION OF SYNCHRONOUS HARQ IN A WIRELESS COMMUNICATION SYSTEM

(75) Inventor: Chun-Yuan Chiu, Pingtung (TW)

(73) Assignee: Industrial Technology Research Institute, Hsinchu (TW)

( * ) Notice: Subject to any disclaimer, the term of this patent is extended or adjusted under 35 U.S.C. 154(b) by 617 days.

(21) Appl. No.: 12/654,906

(22) Filed: Jan. 8, 2010

(65) Prior Publication Data

US 2010/0131814 A1 May 27, 2010

Related U.S. Application Data

(63) Continuation-in-part of application No. 12/112,304, filed on Apr. 30, 2008, now Pat. No. 8,248,973.

(60) Provisional application No. 61/164,592, filed on Mar. 30, 2009.

(51) Int. Cl.
*H04L 1/16* (2006.01)
(52) U.S. Cl. ....................................... 714/751
(58) Field of Classification Search .................. 714/751
See application file for complete search history.

(56) References Cited

U.S. PATENT DOCUMENTS

| | | | |
|---|---|---|---|
| 7,464,313 B2 * | 12/2008 | Smith et al. | 714/748 |
| 7,733,832 B2 * | 6/2010 | Kwak et al. | 370/335 |
| 7,764,644 B2 * | 7/2010 | Harris et al. | 370/328 |
| 8,165,035 B2 * | 4/2012 | Che et al. | 370/252 |
| 2005/0201319 A1 | 9/2005 | Lee et al. | |
| 2005/0201325 A1 | 9/2005 | Kang et al. | |

OTHER PUBLICATIONS

3GPP TSG RAN WG1 Meeting #50, R1-073533; HARQ RTT and Processes Number in TDD; Athens, Greece, Aug. 20-24, 2007; pp. 1-7.
3GPP TSG-RAN WG2 #55, R2-062932; Proposals on the synchronous HARQ in LTE TDD; Seoul, Korea, Oct. 9-13, 2006; pp. 1-5.
3GPP TS 36.300 V8.4.0; 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8); pp. 1-126, Mar. 17, 2008.

* cited by examiner

*Primary Examiner* — Stephen M Baker
(74) *Attorney, Agent, or Firm* — Finnegan, Henderson, Farabow, Garrett & Dunner, LLP

(57) ABSTRACT

A method for operating synchronous HARQ between a transmitting station and a receiving station in a TDD communication system, includes configuring a plurality of HARQ processes at the transmitting station, and transmitting a data burst in a first subframe to the receiving station via one of the plurality of HARQ processes and using a frame structure including a plurality of regions of subframes. The method also includes receiving a second subframe transmitted from the receiving station and containing a HARQ feedback indicative of whether the data burst was correctly received at the receiving station. Further, the method includes determining whether the HARQ feedback is an acknowledgement (ACK) or a negative acknowledgement (NACK), and retransmitting, via the one of the plurality of HARQ processes, the data burst in a third subframe to the receiving station if it is determined that the HARQ feedback is a NACK. A total number of plurality of HARQ processes is determined based on a total number of uplink subframes between the first subframe and the third subframe.

16 Claims, 17 Drawing Sheets

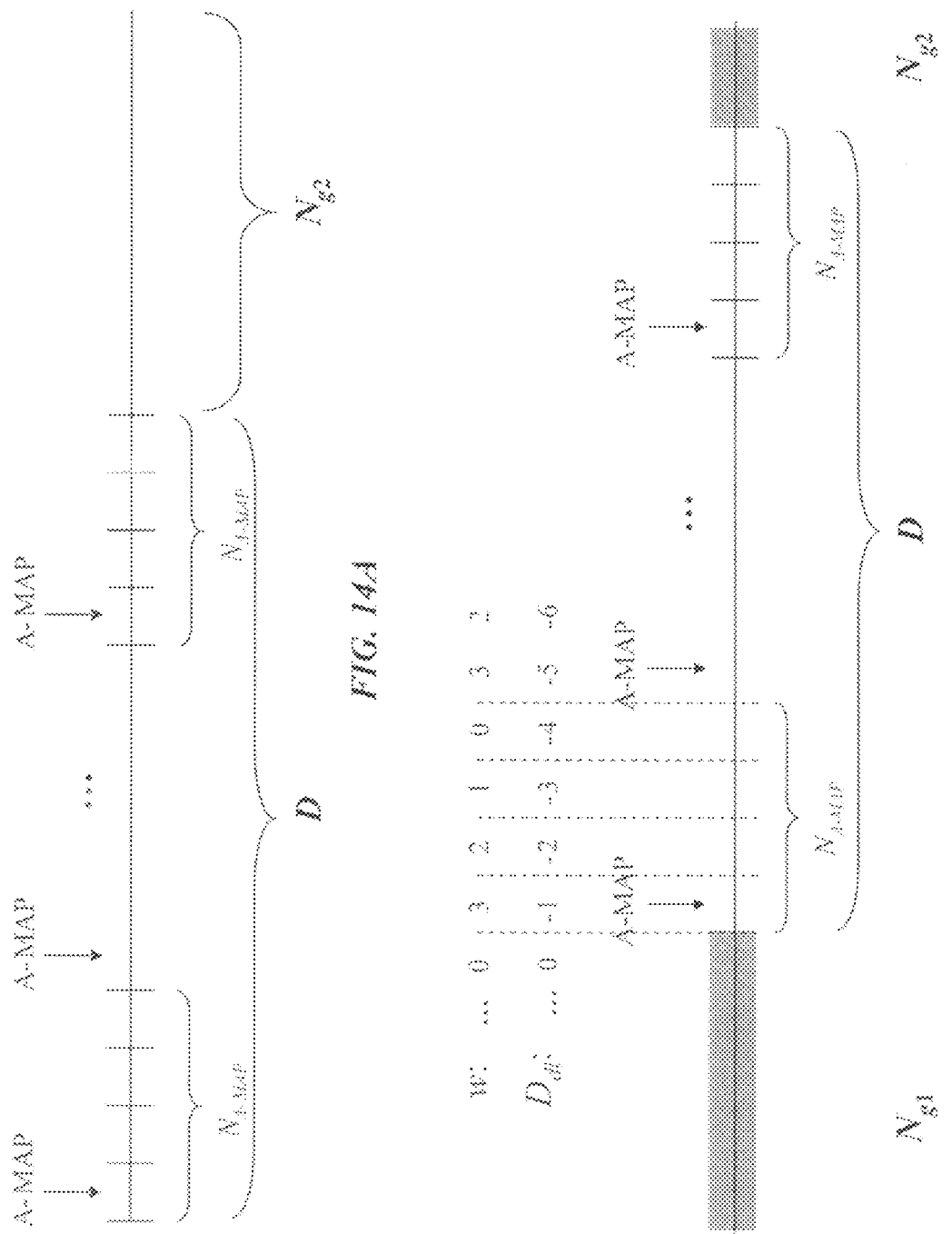

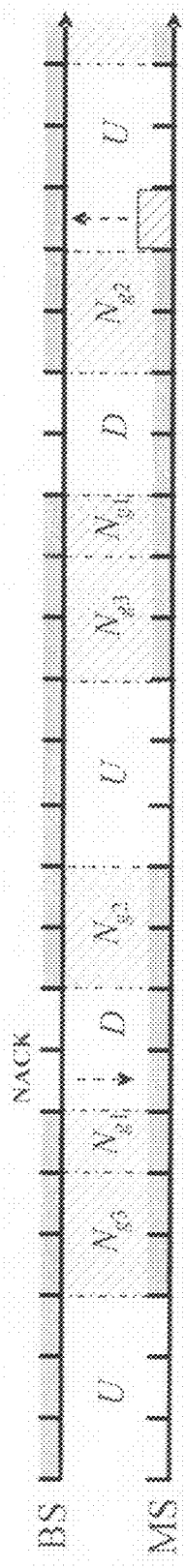
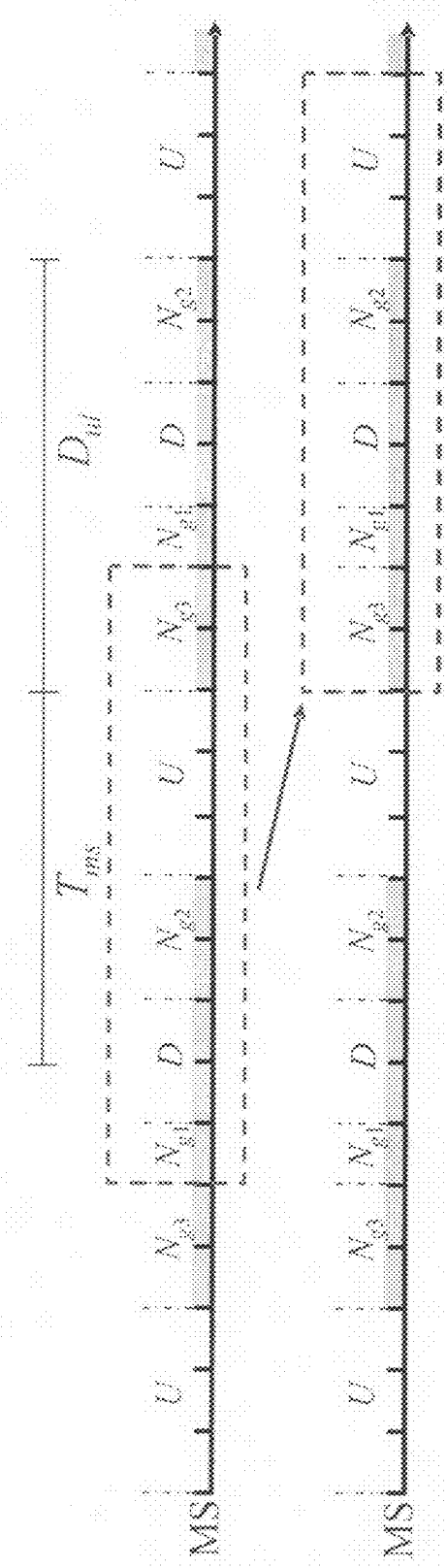
FIG. 15A
FIG. 15B

METHOD FOR OPERATION OF SYNCHRONOUS HARQ IN A WIRELESS COMMUNICATION SYSTEM

CROSS-REFERENCES TO RELATED APPLICATIONS

This application is based upon and claims the benefit of priority from U.S. Provisional Application No. 61/164,592 to Chun-Yuan CHIU filed on Mar. 30, 2009, the entire contents of which are incorporated herein by reference, and is a continuation-in-part application of and claims the benefit of priority from U.S. patent application Ser. No. 12/112,304 to Chun-Yuan CHIU filed on Apr. 30, 2008 now U.S. Pat. No. 8,248,973.

TECHNICAL FIELD

The present disclosure relates to the field of wireless communications and, more particularly, to systems and methods for performing synchronous HARQ in a wireless communication system.

BACKGROUND

Wireless communication systems allow wireless devices to communicate without the necessity of wired connections. Because wireless systems have become highly integrated into daily life, there is a growing demand for wireless communication systems that support multimedia services such as speech, audio, video, file and web downloading, and the like. To support these multimedia services for wireless devices, various wireless communication protocols have been developed to accommodate the growing demands of multimedia services over wireless communication networks.

One such protocol is Wideband Code Division Multiple Access (W-CDMA), which is promulgated by the 3rd Generation Partnership Project (3GPP™), a collaboration of numerous standards development organizations. W-CDMA is a wideband spread-spectrum mobile air interface that uses a direct sequence Code Division Multiple Access (CDMA).

In some embodiments, W-CDMA may support Universal Mobile Telecommunications Systems (UMTS). A UMTS communication system may provide telephony and bearer services in connectionless and connection-oriented communication networks, offering both Point-to-Point (P2P) and Point-to-Multipoint (P2MP) communication. In some UMTS communication systems, the air interface access method may be based on Universal Terrestrial Radio Access Networks (UTRAN), also called UMTS Terrestrial Radio Access Network (also referred to as UTRAN), or Evolved UTRAN (E-TRAN), also referred to as Long Term Evolution (LTE).

Another such protocol is Institute of Electrical and Electronics Engineers (IEEE) 802.16 standard based protocol that use orthogonal frequency division multiple access (OFDMA). An IEEE 802.16m communication system, often called a worldwide interoperability for microwave access (WiMAX) system, provides wireless broadband data, voice, and multimedia services to user.

Wireless communication systems typically operate either in Frequency Division Duplex (FDD) or Time Division Duplex (TDD) mode. In a FDD system, uplink transmission and downlink transmission operate on different channels, or different frequencies, and wireless devices operating in such a FDD system can transmit and receive simultaneously. In a TDD wireless communication system, however, uplink and downlink transmissions may take place over the same communication channel by physically taking turns in the channel. In some systems, such as an upcoming 4G wireless system, TDD is advantageous because asymmetrical data exchange can be supported more efficiently. For example, a spectrum utilization rate can be increased in TDD systems when the system is transmitting asymmetrically.

FIG. 1 is a signaling diagram illustrating a prior art TDD frame structure for an exemplary wireless communication system. A frame 100 may consist of a plurality of time periods available for a downlink or uplink transmission referred to as Transmission Time Intervals (TTIs) 102. As shown in FIG. 1, frame 100 may include an uplink subframe 104 and a downlink subframe 106. Using uplink subframe 104, a downlink node 108 may transmit uplink transmissions 110 for receipt, for example, at an uplink node 112. During downlink subframe 106, uplink node 112 may transmit downlink transmissions 114 for receipt, for example, at downlink node 108. Uplink subframe 104 and downlink subframe 106 may each include any number of TTIs 102, so the size of frame 100 may vary. In some variations, the structure of frame 100 may be dynamically adapted according to the ratio of uplink data to be transmitted to downlink data to be transmitted.

A radio interface protocol stack for W-CDMA may include support for error detection. Automatic Repeat Request (ARQ) and Hybrid Automatic Repeat Request (HARQ) are two error detection methods used to control errors when transmitting data across a wireless network. In ARQ, a receiver detects frame errors and requests retransmissions. HARQ is a variation of the ARQ error control method in which forward error correction bits are also added to correct frame errors.

In some variations, HARQ can be configured to operate using a Stop-And-Wait (SAW) mode or a Selective Repeat (SR) mode. In SAW mode, a HARQ transmitter must wait for a HARQ feedback packet such as an acknowledgement (ACK) or negative acknowledgement (NACK) from the HARQ receiver before transmitting or retransmitting the next data packet. In some variations, an associated control signal including a 1-bit sequence number may be used to distinguish between new transmissions and retransmissions. During the waiting period for the HARQ feedback packet, the transmission channel may go unused.

A transmitting device, or transmitting station, may include a HARQ transmitting (HARQ Tx) mechanism. Similarly, a receiving device, or receiving station, may include a HARQ receiving (HARQ Rx) mechanism. The HARQ Tx and HARQ Rx mechanisms may be any combination of software and/or hardware components configured to cause the transmitting and/or receiving devices to perform the functions of sending and/or receiving HARQ transmissions. The HARQ Tx and HARQ Rx mechanisms may reside in MAC sublayers of the transmission and receiver devices, respectively.

FIG. 2 is a signaling diagram illustrating a prior art transmission using a single HARQ process. In one variation, a HARQ process is an instance of a stop and wait (SAW) protocol, and may be used to control the transmission/retransmission of data. As shown in FIG. 2, a HARQ Tx 202 transmits a data packet 204 to a HARQ Rx 206. HARQ Tx 202 may encode data packet 204 prior to transmission, and HARQ Rx 206 may decode data packet 204. If an error is detected, the received packet data 204 may be discarded and HARQ Rx 206 may request a retransmission by transmitting NACK 208 to HARQ Tx 202. Upon receiving NACK 208, HARQ Tx 202 retransmits a data packet 204' to HARQ Rx 206. After data retransmission data packet 204' is properly received at HARQ Rx 206, HARQ Rx 206 may transmit ACK 210 to HARQ Tx 202, which can then transmit a new data packet 212 to HARQ Rx 206.

A multi-channel version of SAW mode HARQ, using a number N of parallel HARQ processes, may improve transmission efficiencies, for example by reducing control signal overhead. While awaiting the HARQ feedback packet (ACK/NACK) for previously transmitted packet data, other transmissions can be sent. In one variation, a HARQ process identifier, or HARQ process ID, is included in the transmission so HARQ Rx 206 can identify the HARQ process corresponding to a received packet data.

FIG. 3 is a signaling diagram illustrating a prior art transmission having multiple HARQ processes. As shown in FIG. 3, HARQ Tx 202 transmits a data packet 302 from a second HARQ process after data packet 204 is transmitted from a first HARQ process. HARQ Rx 206 transmits an ACK 304 to HARQ Tx 202 upon successful receipt of data packet 302. HARQ Tx 202 may then transmit a new data packet 306 to HARQ Rx 206.

In accordance with the IEEE 802.16 family of standards, HARQ can be configured as synchronous or asynchronous with adaptive or non-adaptive modulation and may include coding schemes for different types of HARQ processing, such as chase combining or incremental redundancy operation. When synchronous HARQ is implemented, HARQ transmissions/retransmissions may be transmitted only at predetermined times. In a FDD system, due to the continuous uplink and downlink transmissions over separate channels, synchronous HARQ can be implemented by using the same Round Trip Time (RTT). The HARQ process corresponding to a particular data packet or HARQ feedback packet can be determined using a feedback time slot. In a TDD system, multiple data packets or HARQ feedback packets may be received at a single time slot so a feedback time slot alone may not be sufficient for determining a HARQ process ID.

Further, when synchronous HARQ is implemented in a more advance IEEE 802.16m standard based system, it may be more difficult to determine time parameters associated with a HARQ retransmission and/or HARQ feedback packet.

SUMMARY

An exemplary embodiment discloses a method of operating synchronous HARQ between a transmitting station and a receiving station in a TDD communication system. The method includes configuring a plurality of HARQ processes at the transmitting station, and transmitting a data burst in a first subframe to the receiving station via one of the plurality of HARQ processes and using a frame structure including a plurality of regions of subframes. The method also includes receiving a second subframe transmitted from the receiving station and containing a HARQ feedback indicative of whether the data burst was correctly received at the receiving station. Further, the method includes determining whether the HARQ feedback is an acknowledgement (ACK) or a negative acknowledgement (NACK), and retransmitting, via the one of the plurality of HARQ processes, the data burst in a third subframe to the receiving station if it is determined that the HARQ feedback is a NACK. A total number of the plurality of HARQ processes is determined based on a total number of uplink subframes between the first subframe and the third subframe.

An exemplary embodiment discloses a wireless communication station for wireless communication in a Time Division Duplex (TDD) communication system using synchronous Hybrid Automatic Repeat Request (HARQ) between the wireless communication station and an external wireless device. The wireless communication station includes at least one memory to store data and instructions and at least one processor. The at least one processor is configured to access the memory and, when executing the instructions, configured to configure a plurality of HARQ processes and to transmit a data burst in a first subframe to the external wireless device via one of the plurality of HARQ processes and using a frame structure including a plurality of regions of subframes. The at least one processor is also configured to receive a second subframe transmitted from the external wireless device and containing a HARQ feedback indicative of whether the data burst was correctly received at the external wireless device and to determine whether the HARQ feedback is an acknowledgement (ACK) or a negative acknowledgement (NACK). Further, the at least one processor is configured to retransmit the data burst in a third subframe to the external wireless device if it is determined that the HARQ feedback is a NACK via the one of the plurality of HARQ processes. A total number of the plurality of HARQ processes is determined based on a total number of uplink subframes between the first subframe and the third subframe.

BRIEF DESCRIPTION OF THE DRAWINGS

FIG. 14A shows another exemplary derivation of an additional delay in feedback timing, consistent with certain disclosed embodiments.

FIG. 14B shows exemplary values of certain feedback timing parameters, consistent with certain disclosed embodiments.

FIG. 15A shows an exemplary retransmission timing representation, consistent with certain disclosed embodiments.

FIG. 15B shows an exemplary derivation of an additional delay in retransmission timing, consistent with certain disclosed embodiments.

DETAILED DESCRIPTION

By disclosing exemplary embodiments of a method and system for mapping HARQ feedback packets to a HARQ process to which the HARQ feedback packets are responsive, a HARQ receiver and HARQ transmitter may utilize synchronous HARQ in a TDD communication system. A base station (BS) may include a HARQ Rx and a subscriber station (SS) may include a HARQ Tx. Alternately, a HARQ Rx may reside in a SS and a HARQ Tx may reside in a BS. A receiving station receives data packets from a transmitting station and replies by transmitting feedback packets to the transmitting station. A transmitting station is a station that transmits data packets to a receiving station and receives feedback packets from a receiving station.

Figure 1:
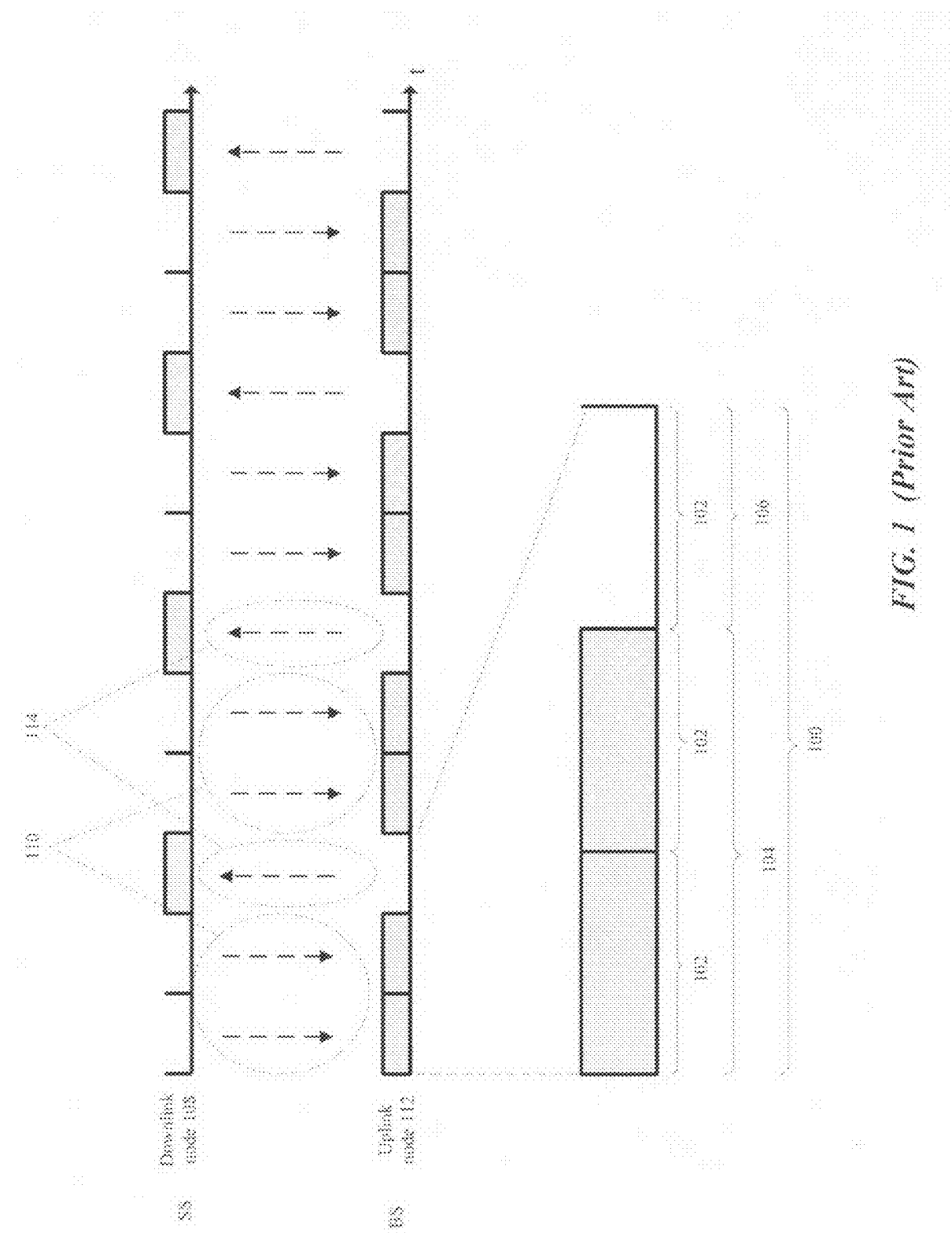
FIG. 1 is a signaling diagram illustrating a prior art TDD frame structure for an exemplary wireless communication system.
Figure 2:
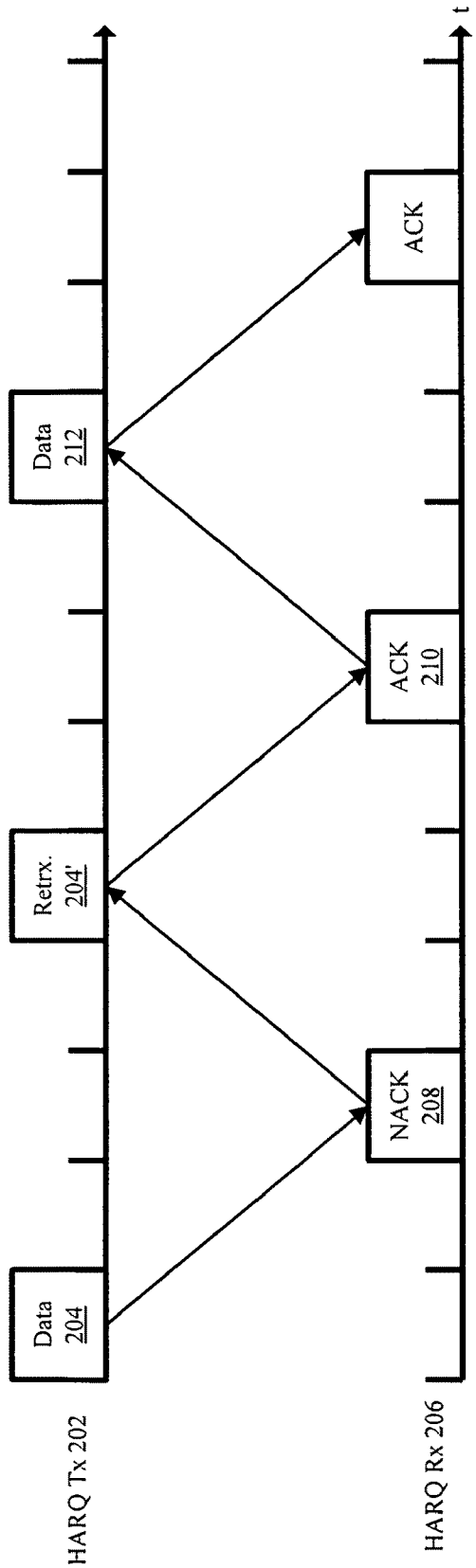
FIG. 2 is a signaling diagram illustrating a prior art transmission using a single HARQ process.
Figure 3:
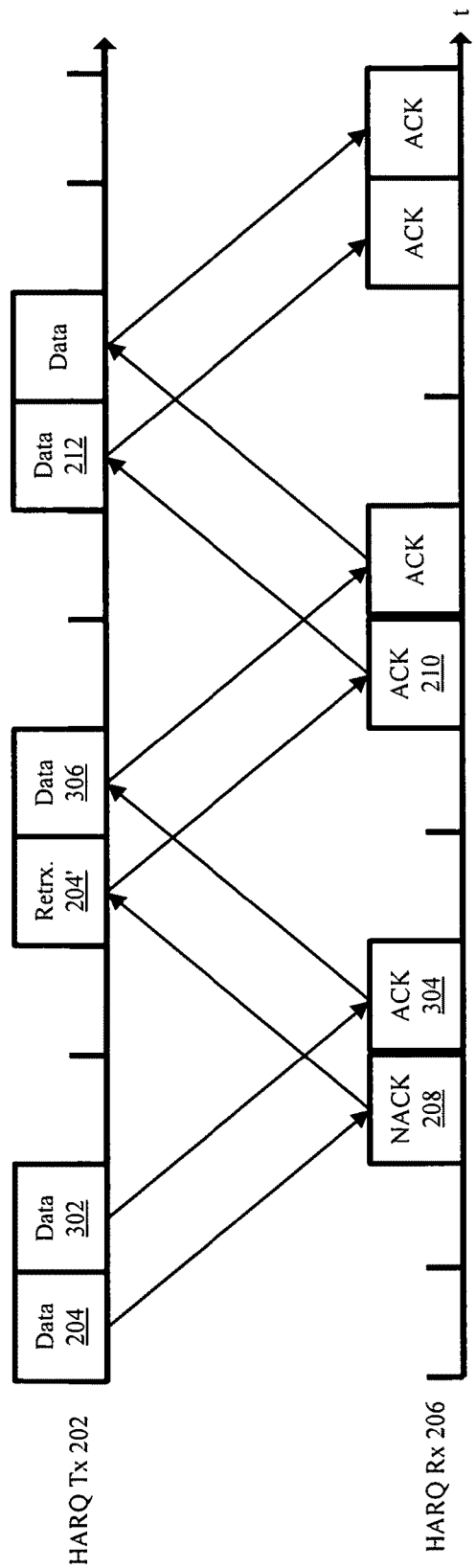
FIG. 3 is a signaling diagram illustrating a prior art transmission having multiple HARQ processes.
Figure 4:
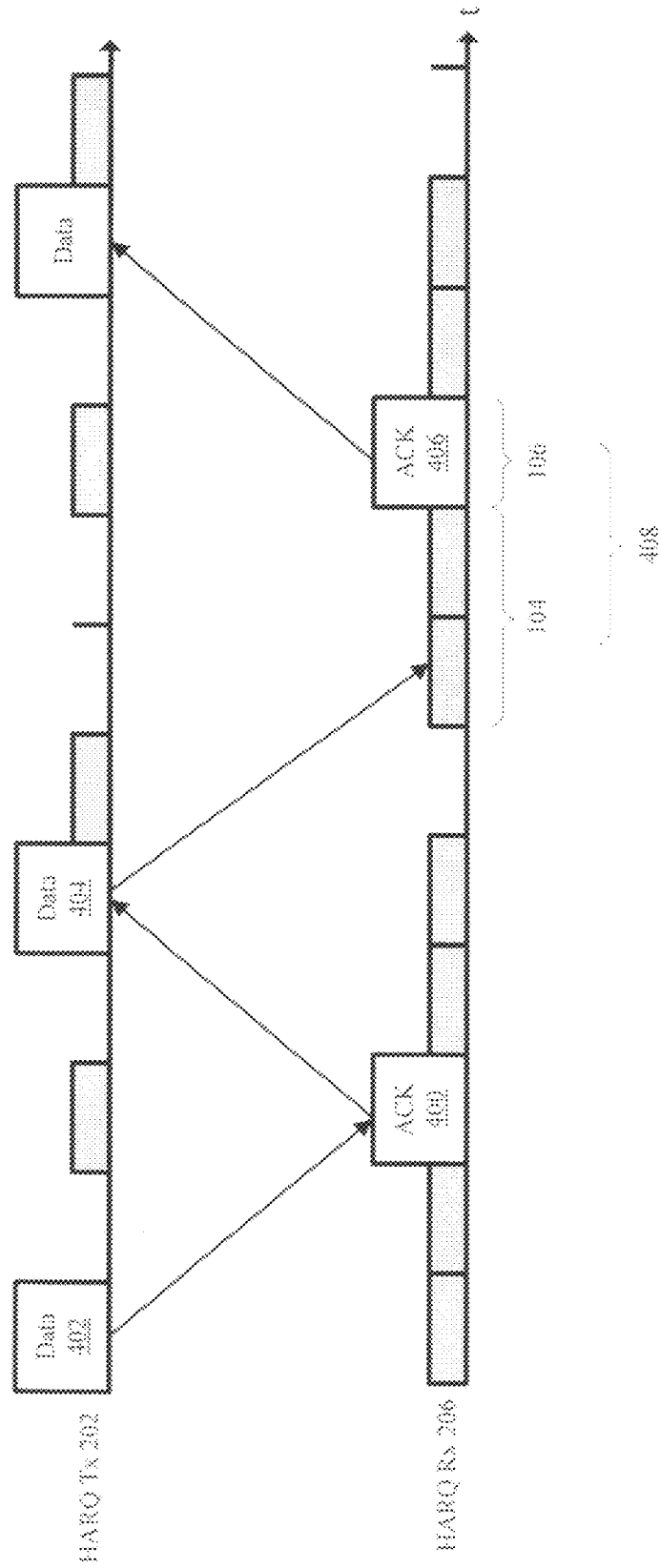
FIG. 4 is a signaling diagram of synchronous HARQ in a TDD communication system.

FIG. 4 is a signaling diagram of synchronous HARQ in a TDD communication system. Due to restrictions on uplink and downlink times, the downlink nodes and uplink nodes are forced to delay their HARQ transmissions until appropriate uplink or downlink subframes. For example, after receiving an ACK 400 from HARQ Rx 206 in response to the transmission of a data packet 402, HARQ Tx transmits a data packet 404. However, HARQ Rx 206 cannot transmit an ACK 406 back to HARQ Tx 202 until downlink subframe 106, and thus, after processing data packet 404 to determine if it was properly received, HARQ Rx 206 is forced to wait for a delay 408. As a result, a single downlink time slot may contain multiple ACKs and/or NACKs corresponding to multiple HARQ processes.

In some embodiments, when performing synchronous HARQ in TDD for a plurality of HARQ processes, the HARQ feedback packets (ACK/NACK) for multiple data packets corresponding to a plurality of HARQ processes may need to be sent during a single downlink. This could be due to, for example, discrepancies in size of downlink subframe 106 and uplink subframe 104 or processing times at HARQ Tx and HARQ Rx.

Figure 5:
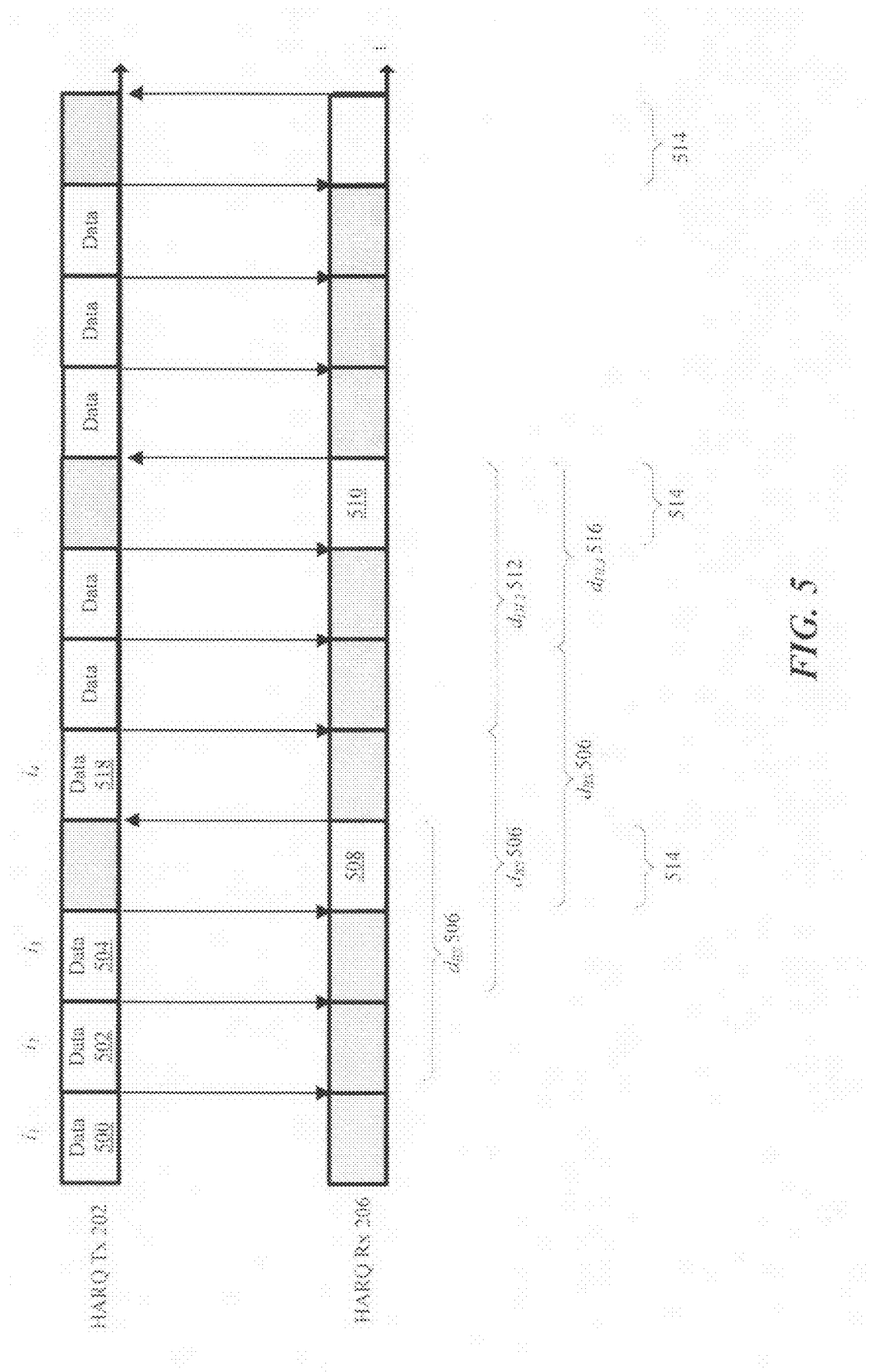
FIG. 5 is a signaling diagram of synchronous HARQ for a plurality of HARQ processes in a TDD system.

For example, FIG. 5 is a signaling diagram of synchronous HARQ for a plurality of HARQ processes in a TDD system. Using the plurality of HARQ processes, HARQ Tx 202 may transmit data packets 500, 502, and 504 during uplink time slots $i_1$, $i_2$, and $i_3$, respectively. Upon receiving data packet 502, HARQ Rx 206 may process data packet 502 to determine if there was an error in this transmission. In one embodiment, a base station time delay $d_{BS}$ 506 is the delay for processing a data packet at HARQ Rx 206. Feedback 508 may then be transmitted, for example, by HARQ RX 206, to HARQ Tx 202. Feedback 508 includes only the HARQ feedback packet (ACK/NACK) corresponding to data packet 500 transmitted at uplink time slot $i_1$ due at least in part to the length of base station time delay $d_{BS}$ 506. After processing data packet 502, during base station time delay $d_{BS}$ 506, HARQ Rx 206 waits additional downlink delay $d_{DL2}$ 512 until a downlink subframe 514, when HARQ Rx 206 can transmit feedback 510 including a HARQ feedback packet corresponding to data packet 502. Similarly, after processing data packet 504 during base station time delay $d_{BS}$ 506, HARQ Rx 206 waits an additional downlink delay $d_{DL3}$ 516 until downlink subframe 514, when HARQ Rx 206 can transmit feedback 510 including a HARQ feedback packet corresponding to data packet 504. In one embodiment, feedback 510 may also include a HARQ feedback packet corresponding to a data packet 518 transmitted at uplink time slot $i_4$. Although not shown in FIG. 5, in some frame structures, a processing delay for HARQ feedback packets at the downlink node, e.g., a subscriber station time delay $d_{SS}$, can take place until the downlink node is able to transmit or retransmit data packets during the next available uplink time slot.

Feedback received during a single uplink slot therefore may include ACK/NACKs for more than one HARQ process and for more than one data packet. In one embodiment, therefore, feedback 510 received at HARQ Tx 202 may include an ACK/NACK corresponding to data packets 502, 504, and/or 518.

Conventional synchronous TDD systems using a plurality of HARQ processes include explicit signaling of HARQ process identification information, or HARQ process ID, along with the HARQ feedback packet to enable wireless communication stations such as an uplink node and downlink node to determine the HARQ process and/or data packet corresponding to a particular HARQ feedback packet sent simultaneously with other HARQ feedback packets. The inclusion of HARQ process ID, however, increases signaling overhead, thereby decreasing overall system efficiency.

Figure 6A:
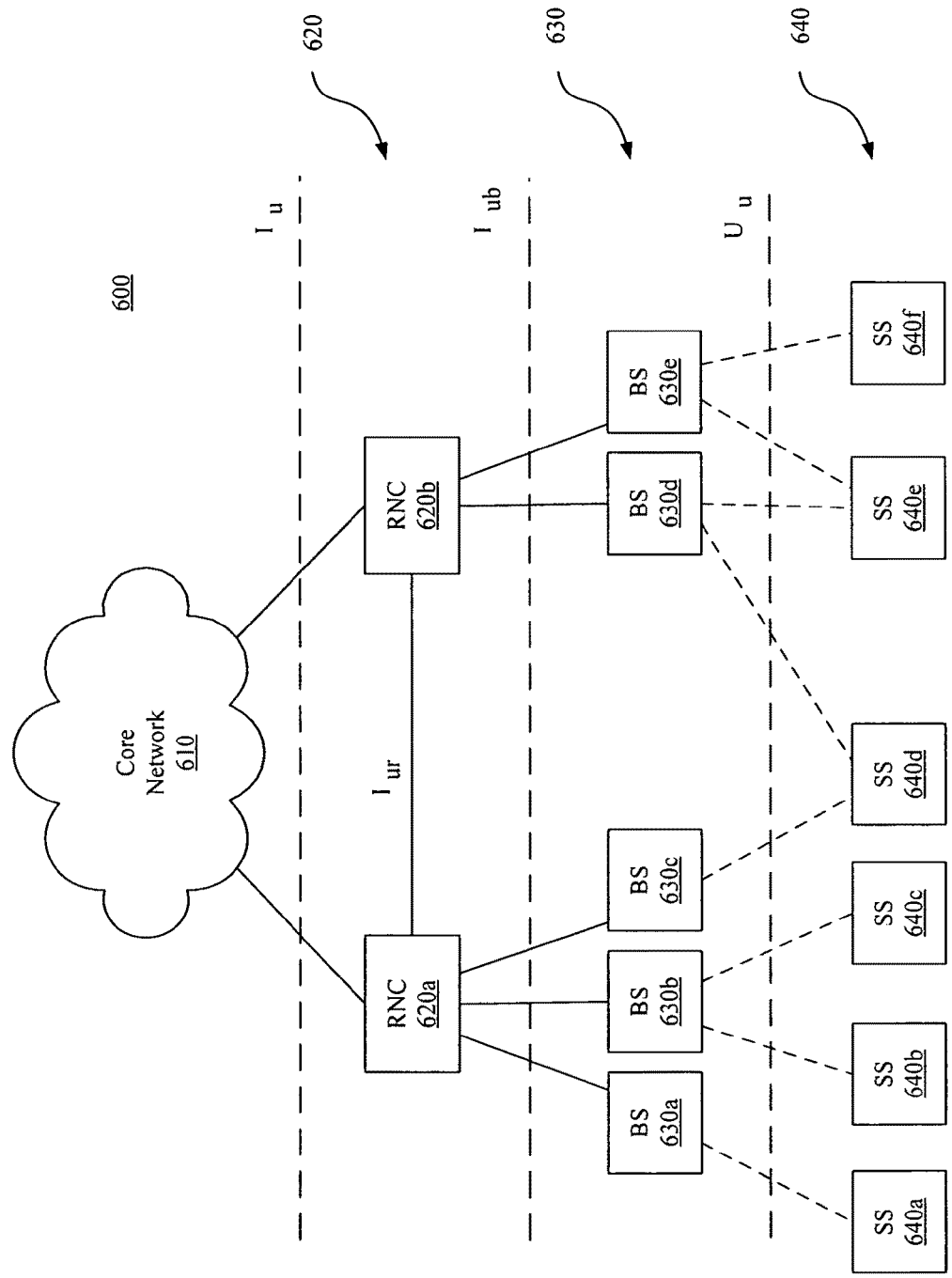
FIG. 6a is a block diagram of an exemplary wireless communication system.

FIG. 6a is a block diagram of an exemplary wireless communication system 600 in which embodiments consistent with the present invention may be practiced. In one embodiment, wireless communication system 600 is a UMTS system. As shown in FIG. 6a, exemplary wireless communication system 600 may include a Core Network (CN) 610, one or more Radio Network Controllers (RNC) 620, e.g., RNC 620a and RNC 620b, one or more Base Stations (BS) 630, e.g., BS 630a, BS 630b, BS 630c, BS 630d, and BS 630e, and one or more Subscriber Stations (SS) 640, e.g., SS 640a, SS 640b, SS 640c, SS 640d, SS 640e, and SS 640f. It should be noted that different terminologies and functionalities may be used in different wireless systems.

CN 610 may be a network or group of communication networks configured to provide communication services. CN 610 may provide, for example, switching, routing and transit for user traffic. In addition, CN 610 may maintain databases and network management functions. In some embodiments, CN 610 may be based on the Global System for Mobile Communications (GSM) network architecture. CN 610 may include any combination of wired and/or wireless connections.

Each RNC 620 may be any type of communication device configured to operate in the exemplary wireless communication system 600, many such communication devices being known in the art. Each RNC 620 may be responsible for resource management, mobility management, encryption, etc., in a wireless communication system. In addition, each RNC 620 may be responsible for control of one or more BSs 630. Although not shown, one or more of RNCs 620 may be connected to CN 610 through one or more gateway devices and the like.

Each RNC 620 may include one or more of the following components: a central processing unit (CPU) configured to execute computer program instructions to perform various processes and methods, random access memory (RAM) and read only memory (ROM) configured to access and store information and computer program instructions, a memory to store data and information, databases to store tables, lists, or other data structures, I/O devices, interfaces, antennas, etc. Each of these components is well-known in the art and will not be discussed further.

Each BS 630 may be any type of communication device configured to transmit and/or receive data and/or communications to and from one or more SSs 640 in a wireless communication system, many such communication devices being known in the art. In some embodiments, BS 630 may also be referred to as, for example, a Node-B, a base transceiver system (BTS), an access point, etc. Communication between BSs 630 and RNCs 620 may be any combination of wired and/or wireless connections. Communication between BSs 630 and SSs 640 may be wireless. In one exemplary embodiment, BS 630 may have a broadcast/reception range within which BS 630 may wirelessly communicate with one or more SSs 640. Broadcast ranges may vary due to power levels, location, and interference (physical, electrical, etc.).

Figure 6B:
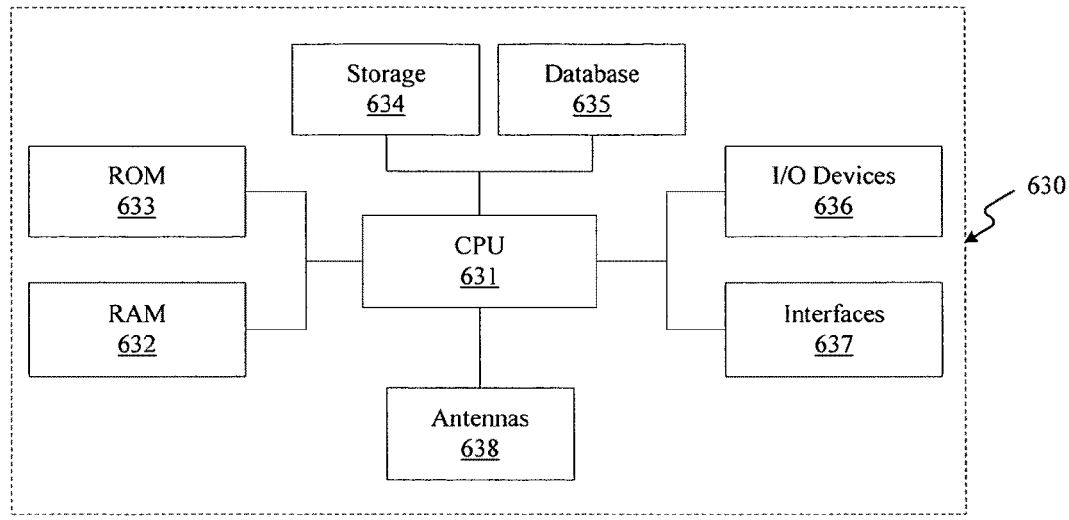
FIG. 6b is a block diagram illustrating an exemplary construction of a base station.

FIG. 6b is a block diagram illustrating an exemplary construction of BS 630. As shown in FIG. 6b, each BS 630 may include one or more of the following components: at least one central processing unit (CPU) 631 configured to execute computer program instructions to perform various processes and methods, random access memory (RAM) 632 and read only memory (ROM) 633 configured to access and store information and computer program instructions, memory 634 to store data and information, database 635 to store tables, lists, or other data structures, I/O devices 636, interfaces 637, antennas 638, etc. Each of these components is well-known in the art and will not be discussed further.

Referring to FIG. 6a, SS 640 may be any type of computing device configured to wirelessly transmit and/or receive data to and from one or more of BSs 630 in a wireless communication system. In certain exemplary environments, SS 640 may be a fixed antenna or mobile SS and may also be referred to as User Equipment (UE). SS 640 may include, for example, servers, clients, mainframes, desktop computers, laptop computers, network computers, workstations, personal digital assistants (PDA), tablet PCs, scanners, telephony devices, pagers, cameras, musical devices, etc. In one exemplary embodiment, SS 640 may be a mobile computing device.

Figure 6C:
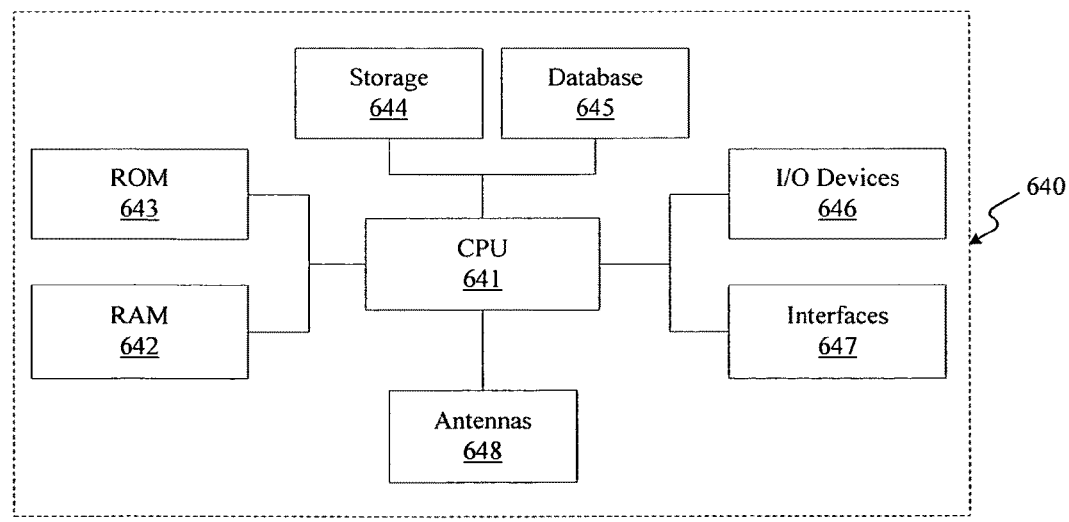
FIG. 6c is a block diagram illustrating an exemplary construction of a subscriber station.

FIG. 6c is a block diagram illustrating an exemplary construction of SS 640. As shown in FIG. 6c, each SS 640 may include one or more of the following components: at least one central processing unit (CPU) 641 configured to execute computer program instructions to perform various processes and methods, random access memory (RAM) 642 and read only memory (ROM) 643 configured to access and store information and computer program instructions, memory 644 to store data and information, database 645 to store tables, lists, or other data structures, I/O devices 646, interfaces 647, antennas 648, etc. Each of these components is well-known in the art and will not be discussed further.

Communication between the CN 610, RNCs 620, BSs 630, and SSs 640 may be by means of logical connections. These logical connections may be referred to as interfaces. As shown in FIG. 6a, the logical connections between CN 610 and RNCs 620 may be referred to as $I_u$ interfaces; the logical connections between RNCs 620 and one or more other RNCs 620 may be referred to as $I_{ur}$ interfaces; the logical connections between RNCs 620 and BSs 630 may be referred to as $I_{ub}$ interfaces; and the logical connections between BSs 630 and SSs 640 may be referred to as $U_u$ interfaces. In one embodiment, the $I_u$, $I_{ur}$, and $I_{ub}$ interfaces may be implemented using Asynchronous Transfer Mode (ATM). In one embodiment, the $U_u$ interface may be implemented using W-CDMA.

Figure 7:
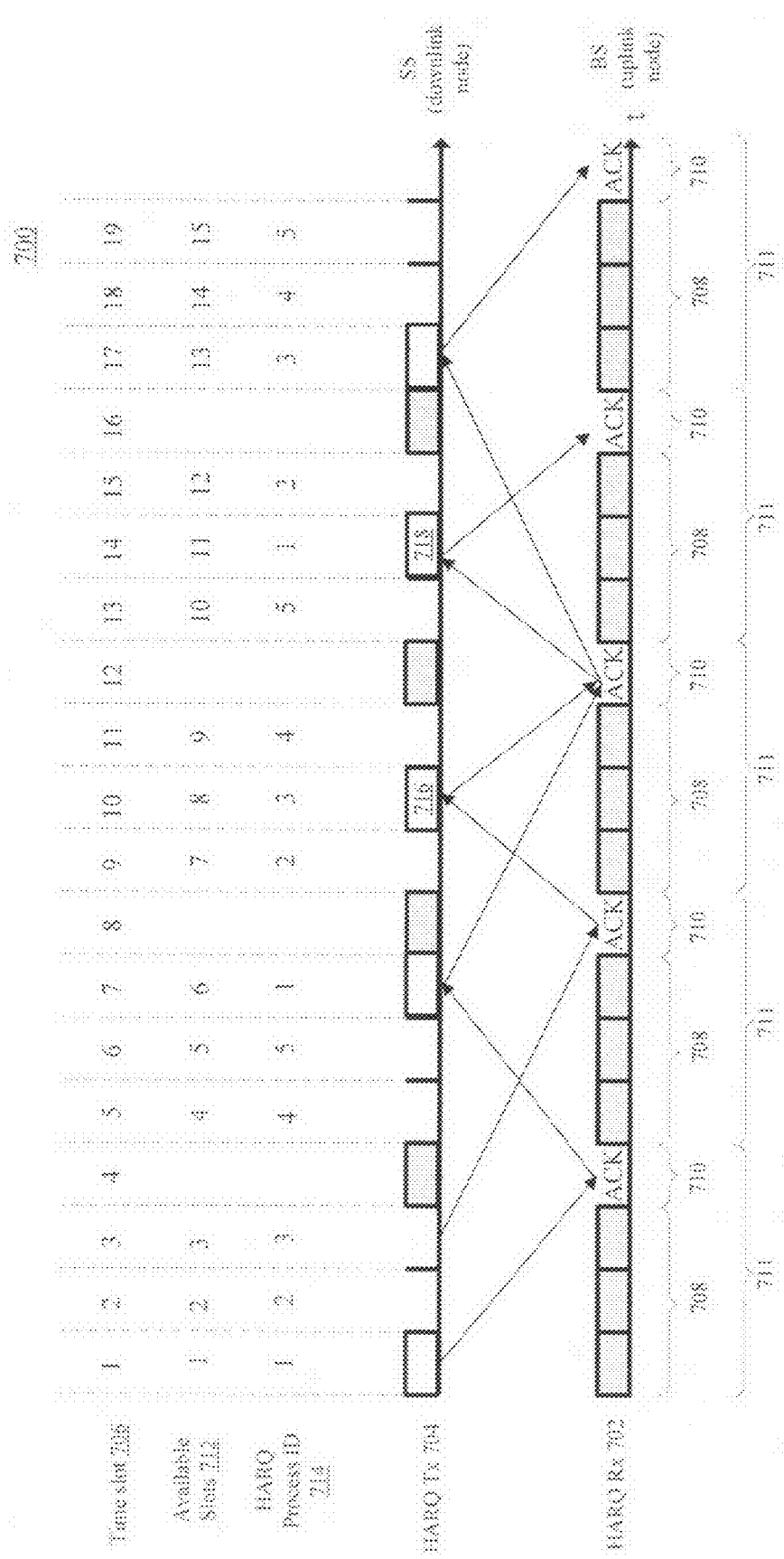
FIG. 7 is a signal diagram of an exemplary TDD synchronization scheme for use in a TDD frame structure, consistent with certain disclosed embodiments.

FIG. 7 is a signal diagram of an exemplary TDD synchronization scheme 700 for use in a TDD frame structure, consistent with certain disclosed embodiments. In the illustrated TDD synchronization scheme, an uplink node may have a HARQ Rx 702 and a downlink node may have a HARQ Tx 704. HARQ Rx 702 and HARQ Tx 704 may be any combination of software and/or hardware components configured to cause the transmitting and/or receiving devices to perform the functionality of the disclosed embodiments. For example and without limitation, the HARQ Rx 702 and HARQ Tx 704 may reside in MAC sub-layers of the transmission and receiving devices, respectively.

Transmission and reception of packets by HARQ Rx 702 and HARQ Tx 704 takes place in time slots 706. Time slots 706 include uplink time slots 708 and downlink time slots 710 which combine to form frames 711. The downlink node may be, for example, SS 640. The uplink node may be, for example, BS 630. Using exemplary TDD synchronization scheme 700, a HARQ process ID may be selected if an available uplink time slot number and a maximum number of HARQ processes are known. As shown in FIG. 7, in exemplary TDD synchronization scheme 700, not all time slots 706 may be used for uplink transmission. Rather, those time slots 706 which may be used for uplink transmissions such as uplink time slots 708 may be available time slots 712. As shown in FIG. 7, a plurality of HARQ processes, each given a respective HARQ process ID 714, are performed in rotation in available time slots 712. In one embodiment, HARQ Tx 704 can determine the HARQ process ID 714 corresponding to a transmitted data packet according to the following equation (1):

$$\text{HARQ Process ID} = \text{Available\_Time\_Slot\_Number} \\ \text{mod Maximum\_Number\_of\_HARQ\_Processes} \quad (1)$$

In exemplary scheme 700 shown in FIG. 7, the maximum number of HARQ processes is set to five. A data packet 716 is transmitted at time slot 706 number 10, which corresponds to available time slot 712 number 8. HARQ Process ID 714 for data packet 716 is determined to be 3 using the above equation (1), because 8 mod 5=3. Similarly HARQ Process ID 714 for data packet 718, which is transmitted at available time slot 11 is 1 because 11 mod 5=1.

In other embodiments, an exemplary TDD synchronization scheme may be used wherein the HARQ Process ID 714 is associated with a particular position within frame 711, and the number of HARQ processes is selected to match a multiple of the size of the frame 711, which varies depending on the number of uplink time slots 708 and downlink time slots 710. In such a system, the HARQ process ID 714 may be determined according to the following equation (2):

$$\text{HARQ Process ID} = \text{Time\_Slot\_Number mod Maximum\_Number\_of\_HARQ\_Processes} \quad (2)$$

According to certain embodiments, a preferred number of HARQ processes to be configured in a transmitting station such as HARQ Tx 704 may be determined. Increasing the number of parallel HARQ processes may increase the buffering requirements and uplink signaling requirements and may result in long Round Trip Time (RTT). Long RTT may lead to false selection of a Modulation and Coding Scheme (MCS), which will result in erroneous packet reception. As such, adaptive modulation and coding (AMC) may fail due to long RTT when the number of HARQ processes is increased. Moreover, when a Frame Check Sequence (FCS) is applied, HARQ state information may need to be communicated to a new BS. In order to minimize signaling load in the uplink, the preferred number of HARQ processes may be limited. However, the number of HARQ processes to be configured should be large enough such that all HARQ processes have enough time to process data. If too few HARQ processes are used, uplink time slots may be wasted while the HARQ processes await HARQ feedback packets for their previously transmitted packet data.

Figure 8:
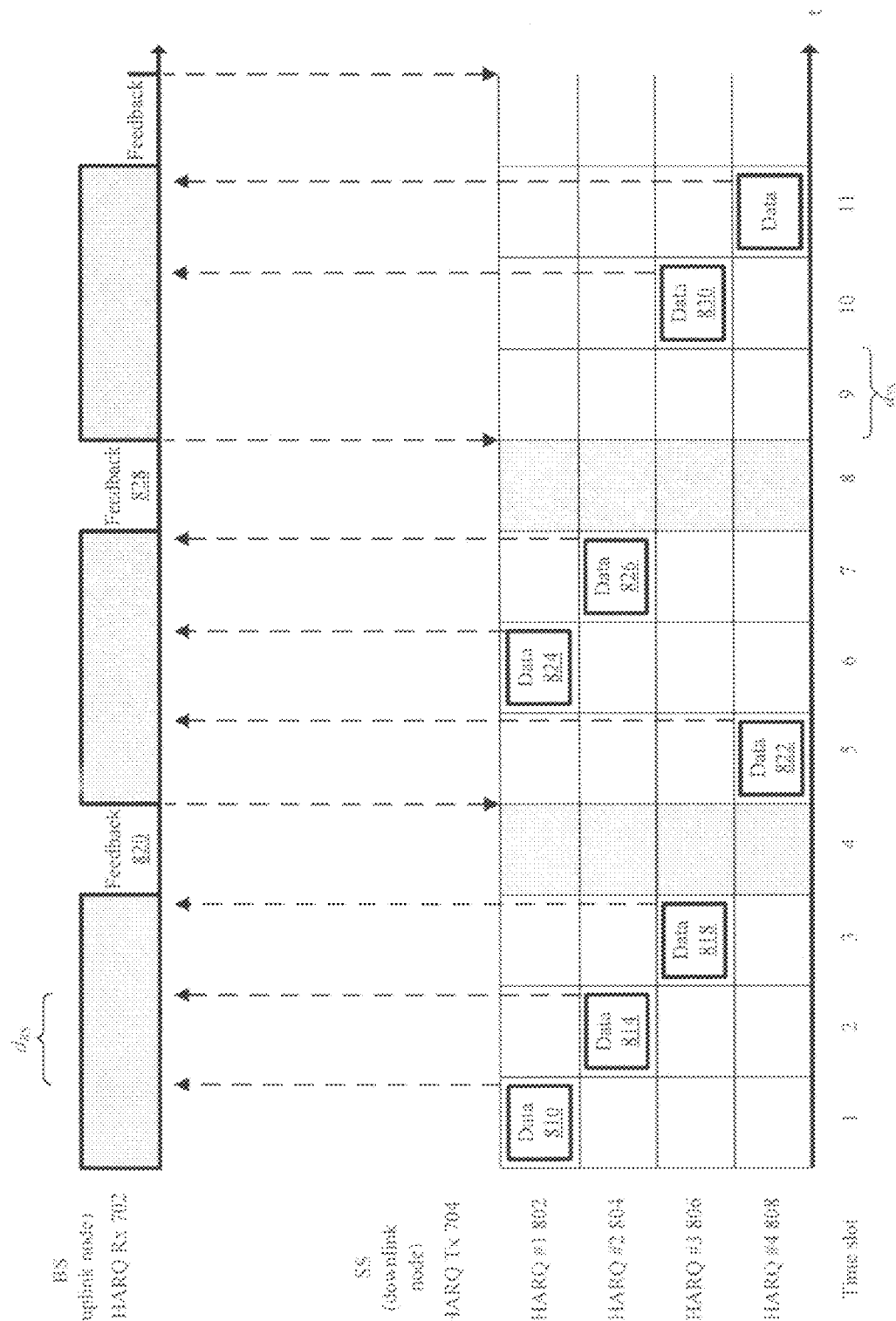
FIG. 8 is a signaling diagram of an exemplary TDD synchronization scheme for use in a TDD frame structure, consistent with certain disclosed embodiments.

FIG. 8 is a signaling diagram of an exemplary TDD synchronization scheme for use in a TDD frame structure, consistent with certain disclosed embodiments. For example, as shown in FIG. 8, HARQ Tx 704 may configure a first HARQ process 802, a second HARQ process 804, a third HARQ process 806, and a fourth HARQ process 808. As shown, a base station time delay $d_{BS}$ for processing a data packet, and a subscriber station time delay $d_{SS}$ for processing HARQ feedback data are both one Transmission Time Interval (TTI). In other embodiments, more or fewer processing TTIs may be used for one or more of base station time delay $d_{BS}$ and subscriber station time delay $d_{SS}$.

As shown in FIG. 8, each of HARQ processes 802, 804, 806, and 808 at HARQ Tx 704, e.g., a SS, transmits a data packet to HARQ Rx 702, which may receive all or parts of the data packets and may transmit HARQ feedback packets or data responsive to the data packets indicative of whether the data packets were properly and/or erroneously received. HARQ processes 802, 804, 806, and 808 are SAW HARQ processes and are configured to operate sequentially. For example, second HARQ process 804 follows first HARQ process 802 in the transmission of data packets and receipt of HARQ feedback packets, third HARQ process 806 follows second HARQ process 804, and fourth HARQ process 808 follows third HARQ process 806.

For example, as shown in FIG. 8, at time slot 1, first HARQ process 802 may transmit a data packet 810 to HARQ Rx 702. While HARQ Rx 702 processes data packet 810 for time period $d_{BS}$ at time slot 2, second HARQ process 804 may transmit a data packet 814 to HARQ Rx 702. At time slot 3, third HARQ process 806 may transmit a data packet 818 to HARQ Rx 702 while HARQ Rx 702 processes data packet 814.

At time slot 4, HARQ Rx 702 transmits feedback 820 to HARQ Tx 704. Feedback 820 includes HARQ feedback packets for those data packets HARQ Rx 702 has processed as of time slot 4 given base station time delay $d_{BS}$, namely, data packets 810 and 814. In accordance with one embodiment, feedback 820 may be in the form of a bitmap or other data structure which includes one or more HARQ feedback packets. In one embodiment, HARQ Rx 702 may continue to process data packet 818 during the same time slot as its transmission of feedback 820.

Processing of data packets by HARQ Rx 702 and processing of feedback 820 by HARQ Tx 704 continues for time slots 4 through 8. Specifically, at time slots 5, 6, and 7, data packets 822, 824, and 826 are transmitted, respectively, by HARQ processes 808, 802, and 804. In one embodiment, no data packet is processed during time slot 5, and data packets 822 and 824 are processed at time slots 6 and 7, respectively. At time slot 8, HARQ Rx 702 transmits feedback 828 to HARQ Tx 704. Feedback 828 includes HARQ feedback packets for data packets 818, 822, and 824. Meanwhile, HARQ Rx 702 may continue to process data packet 826.

At time slot 9, no data packet can be sent by HARQ Tx 704, because third HARQ process 806 is next in line to transmit a data packet, but third HARQ process 806, having just received feedback for data packet 818, has not yet had time to process the feedback to determine whether it must retransmit data packet 818 or transmit a new data packet. As such, in some embodiments, HARQ Tx 704 does not transmit a data packet during certain time slots. For example, as shown in FIG. 8, no data packet is transmitted at time slot 9, as third HARQ process 806 processes the HARQ feedback packet for data packet 818 for the duration of subscriber station delay $d_{SS}$. Transmission of data packet 830 by third HARQ process 806 may take place at time slot 10. Wasted transmission slots may therefore occur when there are too few HARQ processes for the frame structure implemented and the base station time delay $d_{BS}$ and subscriber station time delay $d_{SS}$ required by a system. To avoid this inefficiency, in some embodiments, a preferred number of HARQ processes N is calculated which is designed to be large enough to minimize and/or eliminate wasted transmission time slots.

Figure 9:
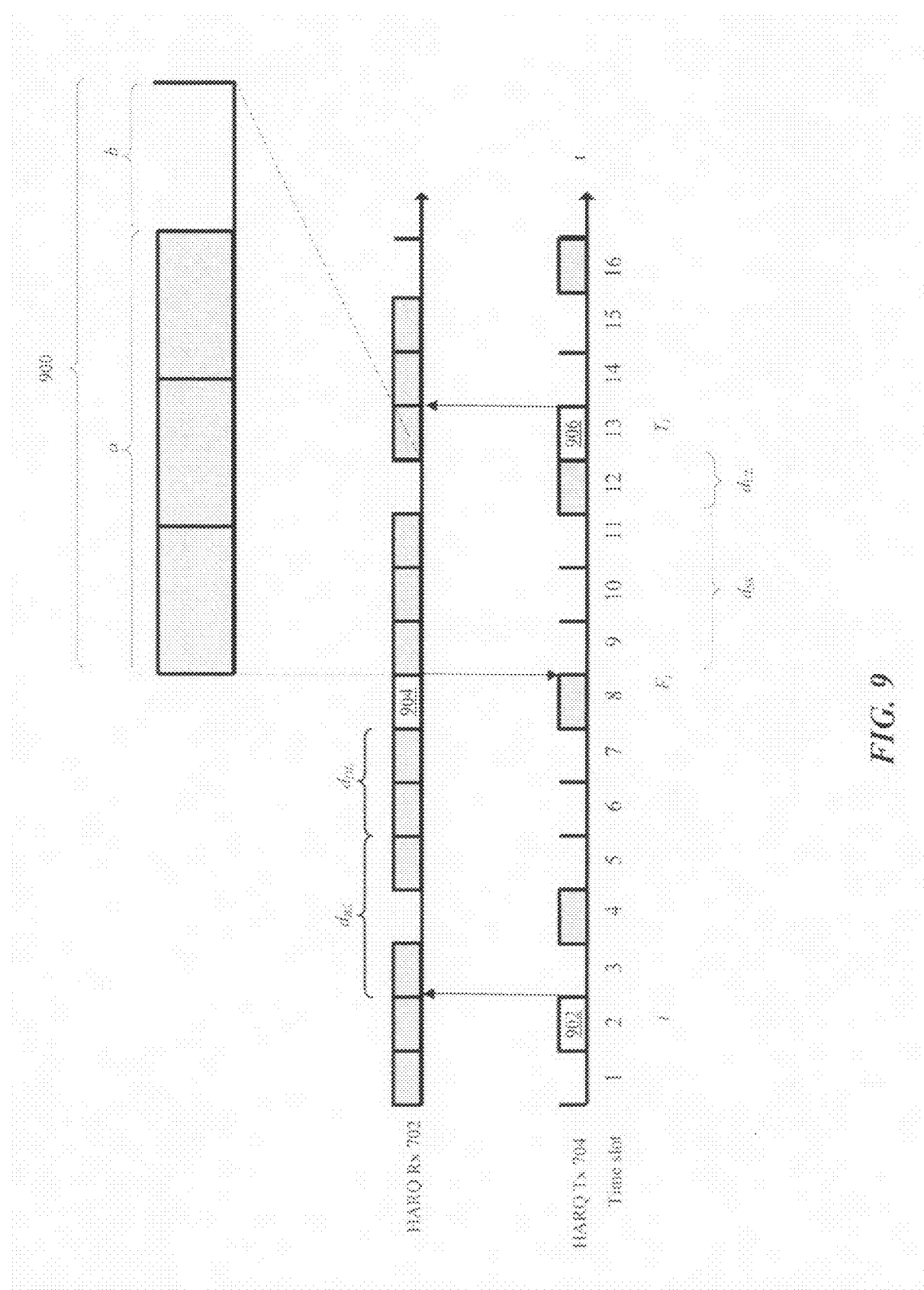
FIG. 9 is a signaling diagram of a system implementing an exemplary algorithm for determining a number of HARQ processes to be configured by a subscriber station and used in a wireless communication system, consistent with certain disclosed embodiments.

FIG. 9 is a signaling diagram of a system implementing an exemplary algorithm for determining a number of HARQ processes to be configured by a subscriber station and used in a wireless communication system, consistent with certain disclosed embodiments. For use in one embodiment, a is a number of time slots for uplink within a frame 900, and b is a number of time slots for downlink within frame 900. For example, as shown in FIG. 9, a is 3 and b is 1. Using the exemplary algorithm, a feedback downlink time slot $F_i$, a transmission time slot $T_i$, and a number of uplink time slots N, can be determined and a transmitting station can determine an optimal quantity N of HARQ processes to be configured.

A data packet 902, transmitted at uplink time slot i, may be processed by HARQ Rx 702 during base station time delay $d_{BS}$. Data packet 902 may thus be processed until a time slot equal to $i+d_{BS}$. If the next slot, $i+d_{BS}+1$, is a downlink slot, an associated feedback 904 is sent back to HARQ Tx 704 at that slot. Otherwise, HARQ Rx 702 will wait an additional downlink delay $d_{DL}$ until it may transmit associated feedback 904. As shown in FIG. 9, for example, base station time delay $d_{BS}$ is 3 TTI, and because the next time slot after time i+3 is not a downlink slot, HARQ Rx 702 waits for additional downlink delay $d_{DL}$ until the next available downlink time slot before it can transmit associated feedback 904.

Feedback downlink time slot $F_i$ is the time slot which associated feedback 904 for data packet 902 transmitted at uplink time slot i is transmitted by HARQ Rx 702 back to HARQ Tx 704. In one embodiment, the position of uplink time slot i within a frame may be calculated as i mod (a+b). In accordance with one exemplary embodiment, the following equation (3) may be used to determine additional downlink delay $d_{DL}$:

$$d_{DL}=a-(i+d_{BS}) \bmod (a+b) \qquad (3)$$

For example, as shown in FIG. 9, $d_{DL(i=2)}=2$.

In accordance with one exemplary embodiment, feedback downlink time slot $F_i$ for uplink time slot i may be determined according to the following equation (4):

$$F_i=\max\{i+d_{BS}+1, i+d_{BS}+(a-(i+d_{BS}) \bmod (a+b))+1\} \qquad (4)$$

For example, as shown in FIG. 9, $F_{i(i=2)}=\max\{6, 8\}=8$.

After HARQ Tx 704 receives associated feedback 904 at time slot $F_i$, HARQ Tx 704 may process associated feedback until time slot $F_i+d_{SS}$. If the next slot after $F_i+d_{SS}$ is an uplink slot, additional data transmission 906 will occur. Otherwise, HARQ Tx 704 will wait an additional uplink delay $d_{UL}$ until it may transmit additional data transmission 906. For example, as shown in FIG. 9, because the next time slot after $F_i+3$ is not an uplink slot, HARQ Tx 704 waits additional uplink delay $d_{UL}$ before transmitting additional data transmission 906. In accordance with one exemplary embodiment, an equation may be used to determine additional uplink delay $d_{UL}$. Specifically, in one embodiment, additional uplink delay $d_{UL}$ may be calculated according to the following equation (5):

$$d_{UL}=b-(F_i+d_{SS}-a) \bmod (a+b) \quad (5)$$

For example, as shown in FIG. 9, $d_{UL(i=2)}=1-(8) \bmod (4)=1$.

Transmission time slot $T_i$ is a time slot at which additional data transmission 906 is transmitted by the SS using the same HARQ process that transmitted the data packet 902 at uplink time slot i. Additional data transmission 906 may be a new data packet if an ACK was received by the SS, or if a NACK was received, a data packet such as data packet 902 will be retransmitted at that time slot $T_i$. In accordance with one exemplary embodiment, an equation may be used to determine time slot $T_i$. Specifically, in one embodiment, transmission time slot $T_i$ may be determined according to the following equation (6):

$$T_i=\max\{F_i+d_{ss}+1, F_i+d_{ss}+(b-(F_i+d_{ss}-a) \bmod (a+b))+1\} \quad (6)$$

For example, as shown in FIG. 9, $T_{i(i=2)}=\max\{12, 13\}=13$

In accordance with one exemplary embodiment, an equation may be used to determine a number of uplink time slots $N_i$ between uplink time slot i and a time slot immediately preceding transmission time slot $T_i$. Specifically, in one embodiment, the number of uplink time slots $N_i$ may be determined according to the following equation (7):

$$N_i = T_i - i - b \times \left( \left\lfloor \frac{T_i}{a+b} \right\rfloor - \left\lfloor \frac{i}{a+b} \right\rfloor \right) \quad (7)$$

For example, as shown in FIG. 9, $N_{i(i=2)}=8$. As shown, eight uplink time slots appear between uplink slot i and time slot 12: time slots 2, 3, 5, 6, 7, 9, 10, and 11.

In one exemplary embodiment, quantity N of HARQ processes to be configured by the SS can not be less than $N_i$ for all uplink time slots i. As discussed above, as the quantity N of HARQ processes increases, buffering, retransmission and signaling overhead may increase and errors may occur. However, too few HARQ processes will result in inefficiencies due to wasted time slots. Moreover, if uplink time slot i and uplink time slot j have the same position within frame 900, i.e., i mod (a+b)=j mod (a+b), then $N_i$ is equal to $N_j$. Thus, in one exemplary embodiment, an optimal quantity N of HARQ processes can be configured according to the following equation (8):

$$N=\max\{N_i, \text{ for all } i=1 \text{ to } a\} \quad (8)$$

Using an algorithm such as the exemplary algorithm including equations (8), (7), (6) and (4) above to determine one or more of N, $N_i$, $T_i$, and $F_i$, a HARQ Rx, e.g., a BS, can determine a quantity N of HARQ processes to be configured. In one embodiment, a HARQ Tx may use the exemplary algorithm to determine a quantity N of HARQ processes that have been or will be configured at a HARQ Tx.

Once the quantity N of HARQ processes is determined, HARQ Tx may then transmit data packets to HARQ Rx using the plurality of HARQ processes N. In one embodiment, the data packets do not include HARQ process identification information, also called HARQ process ID, and HARQ Rx, or BS, may receive, or attempt to receive, the data packets. In some embodiments, upon receipt of the data packets, HARQ Rx may determine the HARQ process ID for the data packets transmitted by the HARQ Tx.

In accordance with one exemplary embodiment, an equation may be used to determine a HARQ process ID for one or more data packets. Specifically, a HARQ process ID for data received at an uplink slot x may be determined according to the following equation (9):

$$\text{HARQ process } ID = \left(x - b \times \left\lfloor \frac{x}{a+b} \right\rfloor\right) \bmod N \quad (9)$$

As such, a HARQ Rx can determine a HARQ process ID when it receives a data packet from a HARQ Tx without receiving an explicit HARQ process ID. Thus, for an uplink HARQ transmission, a BS can determine a HARQ process ID corresponding to a received data packet without receiving an explicit HARQ process ID from an SS. Similarly, for a downlink HARQ transmission, an SS can determine a HARQ process ID corresponding to a received data packet without receiving an explicit HARQ process ID from a BS.

Figure 10:
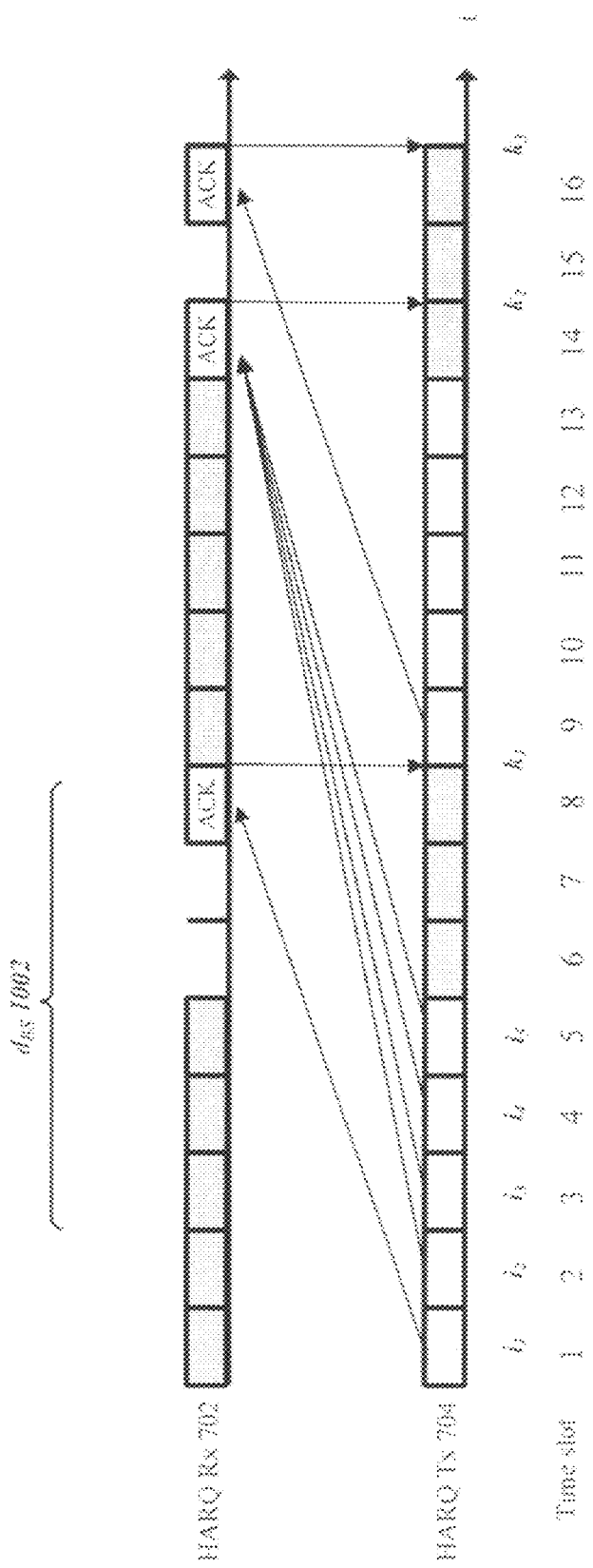
FIG. 10 is a signaling diagram of a system implementing an exemplary algorithm for determining a HARQ process corresponding to HARQ feedback data transmitted at a downlink slot.

FIG. 10 is a signaling diagram of a system implementing an exemplary algorithm for determining the HARQ process corresponding to HARQ feedback data transmitted at a downlink slot. In one embodiment, HARQ Rx 702 may create a bitmap of HARQ feedback packets indicative of whether the data packets were correctly received at the BS. In one embodiment, neither the bitmap nor the feedback packets include HARQ process identification information. HARQ Rx 702 may transmit the bitmap to HARQ Tx 704, which may receive the bitmap at, for example, downlink time slots k, which include downlink time slots $k_1$, $k_2$, and $k_3$.

In one exemplary embodiment HARQ Rx 702 and/or HARQ Tx 704 may map HARQ feedback packets transmitted at downlink slot k that correspond to data packets transmitted at uplink slots $S_k$, $S_k$ and k may be mapped according to the following equation (10):

if $k \bmod (a+b)=a+1$, $S_k=\{i | \text{for all uplink time slots } i \text{ in range from } k-d_{bs}-a-1 \text{ to } k-d_{bs}-1\}$;

else $S_k=\{\text{uplink time slot with number } k-d_{bs}-1\}$. $\quad$ (10)

The feedback packets corresponding to the set of uplink slots $S_k$ may be combined into a bitmap generated at HARQ Rx 702, and the generated bitmap may then be transmitted to HARQ Tx 704 at a predefined time such as downlink slot k. In one embodiment, uplink slots $S_k$ may be mapped into the bitmap in a predefined configuration. In one embodiment, the bitmap does not include HARQ process IDs. After receiving the bitmap, HARQ Tx 704 may determine the uplink slots $S_k$ by using exemplary equation (10).

As shown in the exemplary signal diagram of FIG. 10, a $d_{BS}$ 1002 is 6, a is 5, and b is 3. Thus, applying equation (10) for $k_1=8$, because 8 mod 8 is not equal to a+1 (=6), the feedback for uplink slots $S_k$ transmitted at downlink slots k, $S_k$ are $S_k=\{\text{uplink time slot 1}\}$. In another example applying equation (10), for $k_1=14$, because 14 mod 8 is equal to 6, the uplink slots $S_k$ are time slots in between 2 and 7, which includes uplink slots 2, 3, 4 and 5.

HARQ Rx 702 and HARQ Tx 704 may be any combination of software and/or hardware components configured to cause the transmitting and/or receiving devices to perform the functionality of the disclosed embodiments. In performing the above-described algorithm, HARQ Rx may utilize one or more of CPU 631, RAM 632, ROM 633, memory 634, I/O devices 636, and antennas 638 of BS 630. HARQ Tx may utilize one or more of CPU 641, RAM 642, ROM 643, memory 644, I/O devices 646, and antennas 648 of SS 640.

Figure 11:
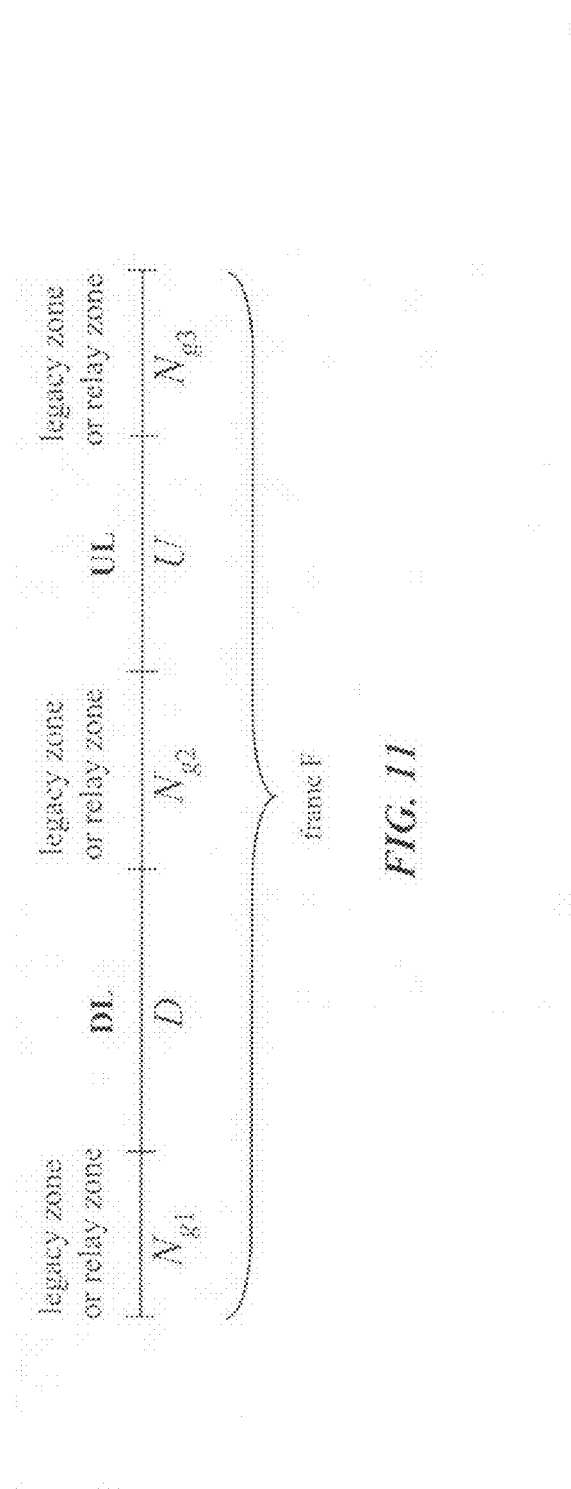
FIG. 11 shows an exemplary frame structure, consistent with certain disclosed embodiments.

In certain embodiments, a frame structure in the uplink path and/or downlink path may include a plurality of subframes and certain different frames are reserved for different purposes. For example, in a certain standard (e.g., IEEE 802.16m) based wireless communication system, TDD channels between a base station and a subscriber unit or mobile station may also include subframes reserved for a legacy zone or a relay zone, in addition to subframes reserved for downlink and uplink. FIG. 11 shows an exemplary frame structure in such wireless communication system used by BS 630 and SS 640.

As shown in FIG. 11, frame F includes a plurality of regions of subframes. For example, frame F may include a DL region consisting of D subframes, a UL region consisting of U subframes, a first idle region reserved for a legacy zone or a relay zone consisting of $N_{g1}$ subframes, a second idle region reserved for a legacy zone or a relay zone consisting of $N_{g2}$ subframes, and a third idle region reserved for a legacy zone or a relay zone consists of $N_{g3}$ subframes. Parameters D, U, $N_{g1}$, $N_{g2}$, and $N_{g3}$ may be any appropriate integer numbers, and each of $N_{g1}$, $N_{g2}$, and $N_{g3}$ may be set to zero (0). Other frame structures may also be used.

During communication between BS 630 and SS 640, BS 630 (e.g., CPU 631) and/or SS 640 (e.g., CPU 641) may determine HARQ parameters used in communication based on frame F. For example, BS 630 and/or SS 640 may determine timing for transmitting a HARQ burst and the corresponding feedback. In uplink communication, SS 640 may also determine timing for retransmission of the HARQ burst. For illustrative purposes, in uplink communication, BS 630 may implement HARQ Rx, and SS 640 may implement HARQ Tx.

Transmission and/or retransmission timing may be represented by a global subframe index $k=i \times N_{frame}+j$, where i is the frame index, j is the subframe index, and $N_{frame}$ is the total number of subframes per frame. An global index, as used here, may refer to an index that representing a subframe counted continuously from a starting subframe beyond frame boundaries. Further, subframe index j takes on values sequentially from 0 to $N_{frame}-1$ and, based on frame F, $N_{frame}=D+U+N_{g1}+N_{g2}+N_{g3}$. For synchronous uplink HARQ processing, for example, SS 640 needs a suitable subframe to transmit a data burst, receives a subframe carrying feedback from BS 630, and needs another suitable subframe to retransmit the data burst if the feedback is a negative acknowledgement (NACK). A data burst or burst, as used herein, may refer to a series of bits of data. Both BS 630 and SS 640 may perform the HARQ processing based on pre-defined timing.

Figure 12:
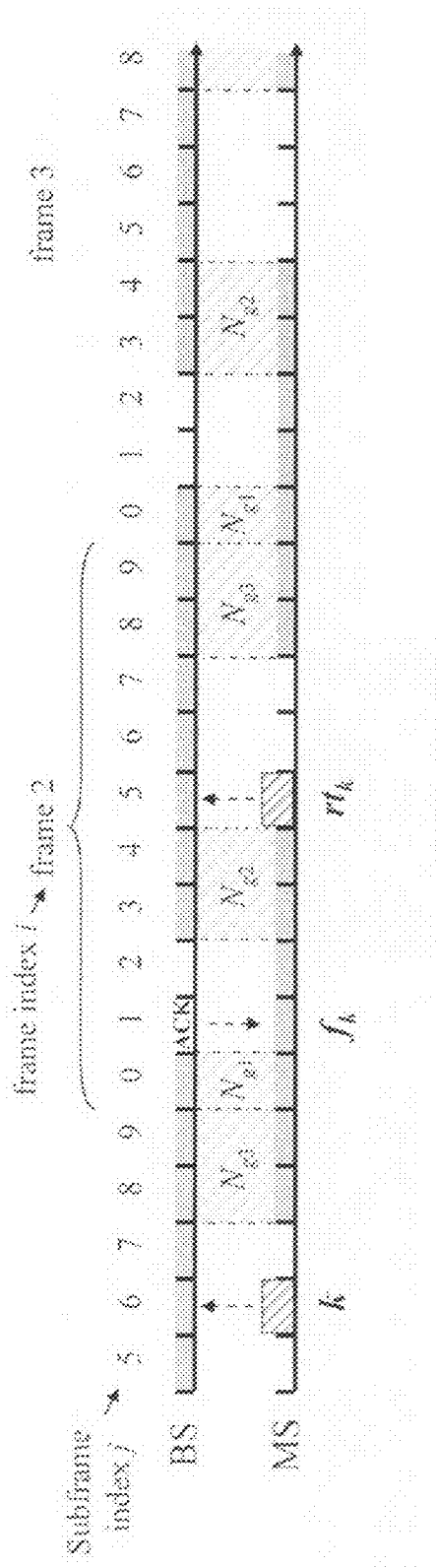
FIG. 12 shows an exemplary transmission, feedback, and retransmission timing for uplink HARQ processing, consistent with certain disclosed embodiments.

FIG. 12 shows an exemplary transmission, feedback, and retransmission timing for uplink HARQ processing. As shown in FIG. 12, an uplink data burst is transmitted at an uplink subframe with a global subframe index k, from SS 640 (i.e., mobile station or MS) to BS 630 (i.e., base station or BS), and the corresponding feedback is sent at a downlink subframe with a global subframe index $f_k$, from BS 630 to SS 640. If a retransmission is needed, the possible retransmission may be transmitted at an uplink subframe with a global subframe index $rt_k$. Subframe index j indicates an exemplary 10 subframes in each frame.

BS 630 and/or SS 640 may determine transmission and/or retransmission timing based on a variety of factors, individually and/or in certain combinations. For example, the variety of factors may include processing delays by BS 630 and SS 640, frame structure parameters (e.g., D, U, $N_{g1}$, $N_{g2}$, and $N_{g3}$), and advanced-MAP (A-MAP) configurations, i.e., parameter $N_{A-MAP}$, indicating a total number of subframes for which one subframe carrying feedback data is included. If parameter $N_{A-MAP}$ has a value of '1', every frame is configured to be capable of carrying feedback data, and if parameter $N_{A-MAP}$ has a value of '2', one in every two frames is configured to be capable of carrying feedback data. Any appropriate values of parameter $N_{A-MAP}$ may also be used. Further, the processing delay of BS 630 and SS 640 may include Rx processing time at BS 630, and Tx processing time $T_{ms}$ SS 640.

If SS 640 transmits an uplink data burst at an uplink subframe k, it would be received and processed by BS 630 until subframe $k+R_{bs}$. BS 630 may try to transmit feedback in the next subframe in downlink, if the next subframe is suitable for transmitting the feedback, i.e., the next subframe is in the DL region, and the downlink subframes in the DL region are capable of carrying feedback data according to the A-MAP setting. If the next subframe $k+R_{bs}+1$ is a downlink subframe, the associated feedback of the data burst may be sent back in the subframe $k+R_{bs}+1$. However, if the next subframe is not in the DL region or if the next subframe is not capable of carrying feedback data (i.e., not having A-MAP), an additional delay to reach an available downlink subframe may be needed.

Figure 13A:
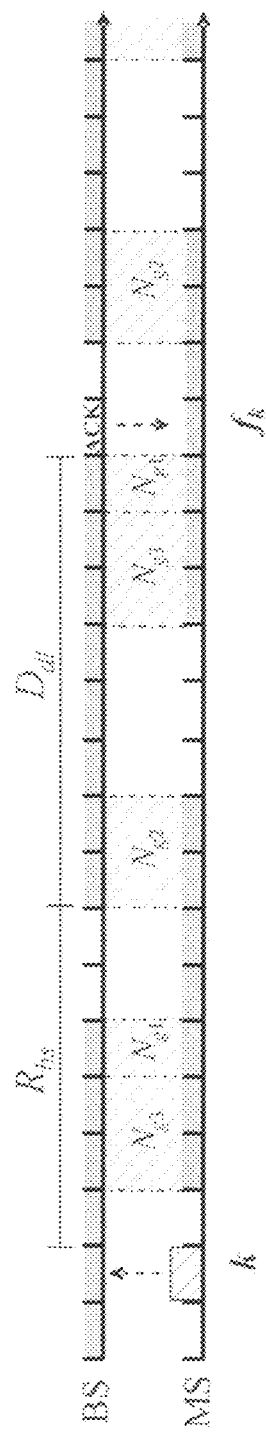
FIG. 13A shows an exemplary feedback timing, consistent with certain disclosed embodiments.

FIG. 13A shows an exemplary feedback timing. As shown in FIG. 13A, the additional delay, denoted by $D_{dl}$, is added after processing delay $R_{bs}$ of BS 630. That is, downlink subframe $f_k$ is determined by $k+R_{bs}+1$ and $D_{dl}$, depending on whether an additional delay condition exists. Downlink subframe $f_k$ is represented by:

$$f_k = \max\{k+R_{bs}+1, k+R_{bs}+D_{dl}+1\} \tag{11}$$

Figure 13B:
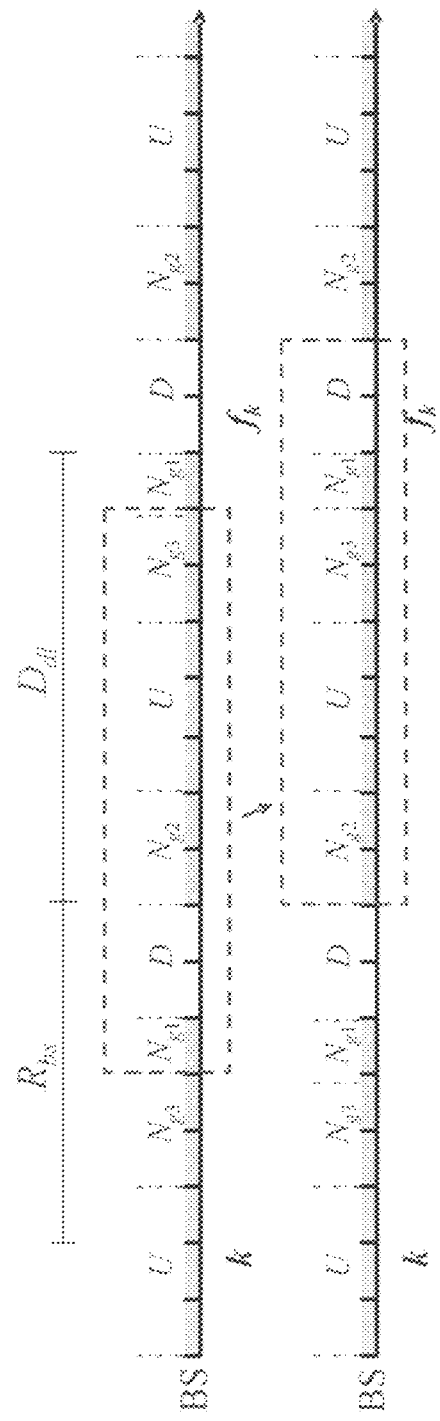
FIG. 13B shows an exemplary derivation of an additional delay in feedback timing, consistent with certain disclosed embodiments.

FIG. 13B shows an exemplary derivation of the additional delay $D_{dl}$, when parameter $N_{A-MAP}$ has a value of '1' (i.e., every downlink frame is capable of transmitting feedback data). As shown in FIG. 13B, the value of $D_{dl}$ is derived from $k+R_{bs}$, frame structures, and A-MAP settings, and can be represented by $$D_{dl} = [(U+N_{g1}+N_{g2}+N_{g3})-(k+R_{bs}+1+U+N_{g2}N_{g3}) \bmod (D+U+N_{g1}+N_{g2}+N_{g3})] \tag{12}$$

Figure 13C:
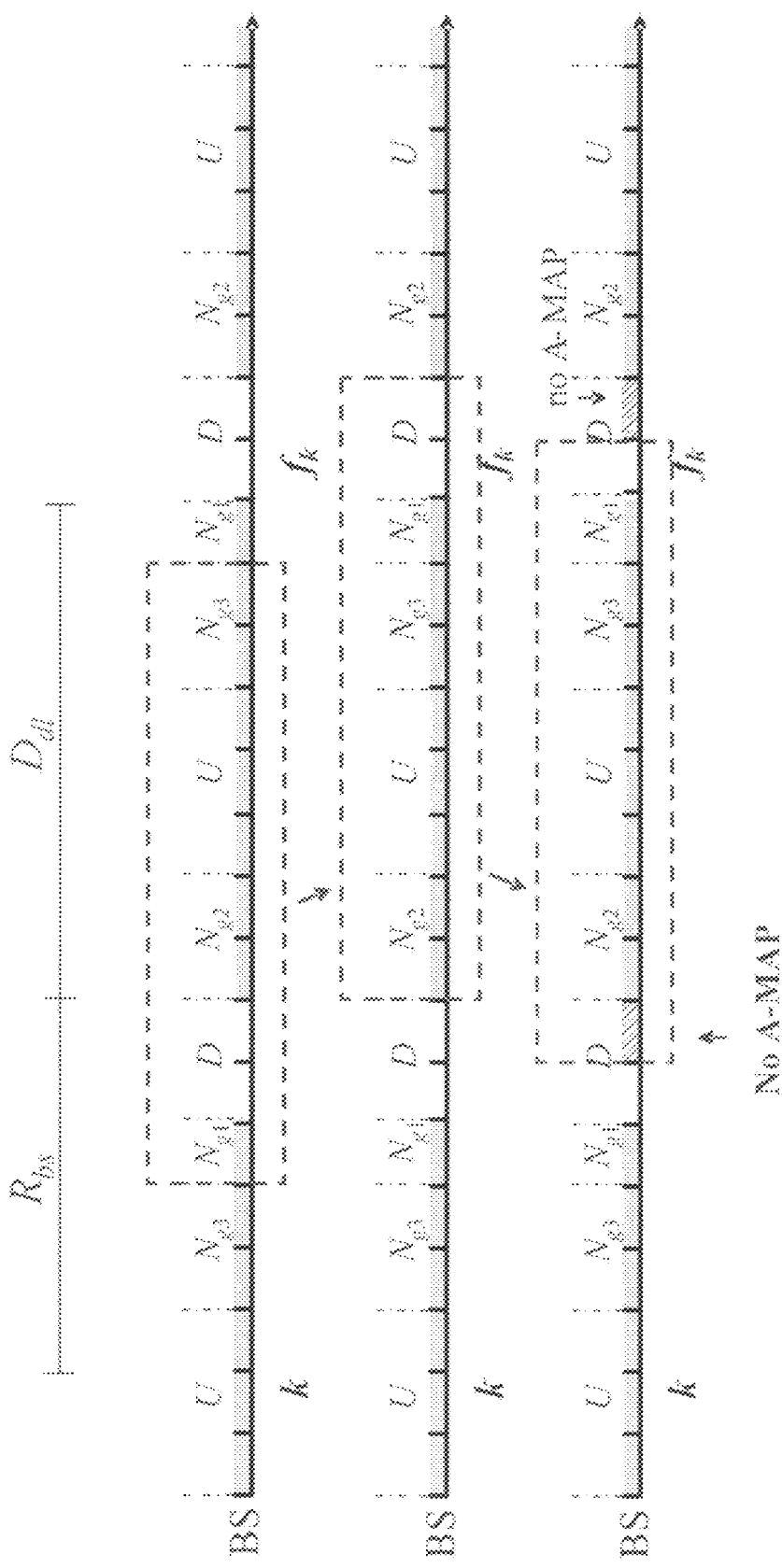
FIG. 13C shows another exemplary derivation of an additional delay in feedback timing, consistent with certain disclosed embodiments.

FIG. 13C shows an exemplary derivation of the additional delay $D'_{dl}$, when parameter $N_{A-MAP}$ has a value of '2' (i.e., one in every two downlink frames/subframes is capable of transmitting feedback data). As shown in FIG. 13C, the value of $D'_{dl}$ is derived from $k+R_{bs}$, frame structures, and A-MAP settings. For illustrative purposes, the first downlink subframe has A-MAP, and the second downlink subframe does not have A-MAP. If the next subframe $k+R_{bs}+1$ is in the DL Region but has no A-MAP region, an additional delay to reach an available downlink subframe, denoted by w, would be needed. The value of w is 0, if $D'_{dl}>0$; and $w=(2+D'_{dl}) \bmod 2$, if $D'_{dl} \leq 0$. $D'_{dl}$ can further be represented by $$D'_{dl} = [(U+N_{g1}+N'_{g2}+N_{g3})-(k+R_{bs}+1+U+N'_{g2}+N_{g3}) \bmod (D'+U+N_{g1}+N'_{g2}+N_{g3})], \tag{13}$$

where $D'=D-(D-1) \bmod 2$; and $N'_{g2}=N_{g2}+(D-1) \bmod 2$.

Further, downlink subframe $f_k$ is represented by:

$$f_k = \max\{k+R_{bs}+1+w, k+R_{bs}+D'_{dl}+1\}, \tag{14}$$

where w is the additional delay to reach a subframe which has A-MAP, as explained above.

FIG. 14A shows an exemplary derivation of additional delay $D'^{dl}$ (not shown), using a general parameter $N_{A-MAP}$ that may take different values. As shown in FIG. 14A, D number of subframes in downlink region DL includes a number of subframes having A-MAP for every $N_{A-MAP}$ number of subframes. For illustrative purposes, the first subframe of every $N_{A-MAP}$ number of subframes has A-MAP and thus is capable of carrying feedback data. For a general $N_{A\text{-}MAP}$ value, downlink subframe $f_k$ is represented by:

$$f_k = \max\{k+R_{bs}+1+w, k+R_{bs}+D'_{df}+1\}, \quad (15)$$

$$D'_{df} = [(U+N_{g1}+N'_{g2}+N_{g3}) - (k+R_{bs}+1+U+N'_{g2}+N_{g3}) \\ \mod (D'+U+N_{g1}+N'_{g2}+N_{g3})], \quad (16)$$

where $D' = D - (D-1) \mod N_{A\text{-}MAP}$, $N'_{g2} = N_{g2} + (D-1) \mod N_{A\text{-}MAP}$, and $w=0$, if $D'_{df} > 0$; and $w = (N_{A\text{-}MAP} + D'_{df}) \mod N_{A\text{-}MAP}$, if $D'_{df} \leq 0$.

FIG. 14B shows exemplary values of 'w' and $D'_{df}$ corresponding to various values of $k+R_{bs}$ indicated by dotted lines.

As previously explained, in uplink, SS 640 also determines retransmission timing based on the transmission timing, processing delay $T_{ms}$, and frame structures (D, U, $N_{g1}$, $N_{g2}$, and $N_{g3}$), etc. FIG. 15A shows an exemplary retransmission timing representation. As shown in FIG. 15A, if SS 640 (i.e., MS) receives a NACK at subframe $f_k$, a retransmission would be prepared until subframe $f_{k+Tms}$. That is, if the next subframe is an uplink subframe, the retransmission subframe is $f_k + T_{ms} + 1$. However, if the next subframe $f_k + T_{ms} + 1$ is not an uplink subframe, an additional delay to reach an available uplink subframe would be needed. FIG. 15B shows an exemplary derivation of an additional delay in retransmission timing.

As shown in FIG. 15B, the additional delay, denoted by $D_{ul}$, is added after processing delay $T_{ms}$ of SS 640. The retransmission subframe with global subframe index $rt_k$ can be represented by $$rt_k = \max\{f_k + T_{ms} + 1, f_k + T_{ms} + D_{ul} + 1\}, \quad (17)$$

where the additional delay $D_{ul}$ can be calculated as $$D_{ul} = \max\{0, (D+N_{g1}+N_{g2}+N_{g3}) - (f_k + T_{ms} + 1 + N_{g3}) \mod N_{frame}\}. \quad (18)$$

Figure 16:
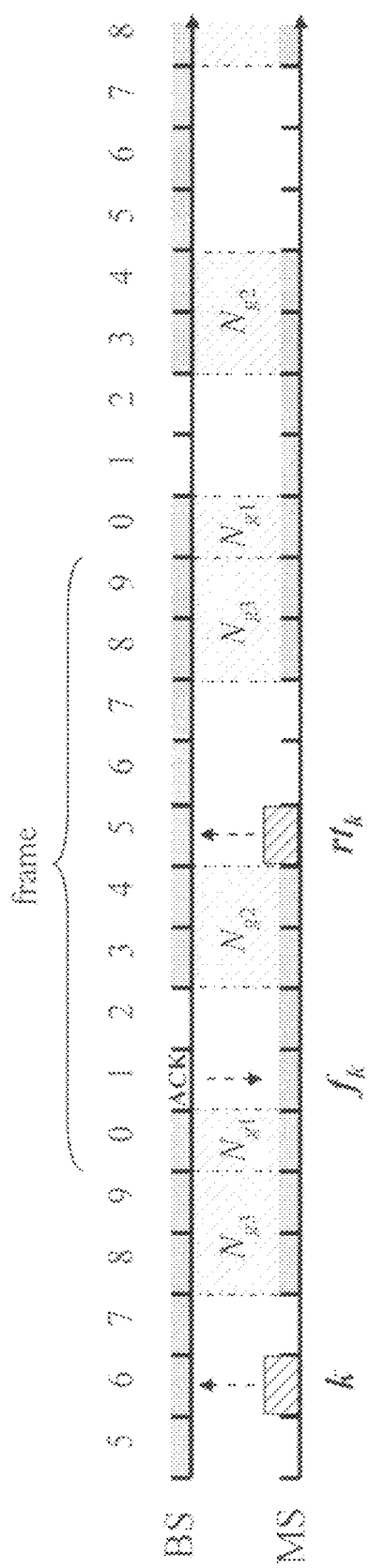
FIG. 16 shows an exemplary derivation of HARQ process numbers, consistent with certain disclosed embodiments.

FIG. 16 shows an exemplary derivation of HARQ process numbers in a subscriber unit or SS 640 (i.e., MS). As shown in FIG. 16, during the period from k to $rt_k$, SS 640 may be idle. To increase efficiency, SS 640 may implement a plurality of HARQ processes, each handles transmission and/or retransmission of a different data burst and receiving feedback from BS 630. SS 640 may determine the number of the HARQ processes based on various parameters.

For example, if $N_k$ is the number of uplink subframes from subframe k to $rt_k - 1$, SS 640 may determine that the maximum number of HARQ processes, denoted by N, would not be less than $N_k$, so as to increase efficiency. Other values may also be used. For example, SS 640 may determine N and $N_k$ based on the transmission and retransmission timing.

For example, SS 640 may determine $N_k$ as the number of uplink subframes from uplink subframe k to $rt_k - 1$. Then the value of N can be calculated as $$N = \max\{N_k, \text{ for all } k = D + N_{g1} + N_{g2} \text{ to } D + U + N_{g1} + N_{g2} - 1\}, \quad (19)$$

where $$N_k = rt_k - k - (D + N_{g1} + N_{g2} + N_{g3}) \times \\ \left(\left\lfloor \frac{rt_k}{D+U+N_{g1}+N_{g2}+N_{g3}} \right\rfloor - \left\lfloor \frac{k}{D+U+N_{g1}+N_{g2}+N_{g3}} \right\rfloor\right).$$

That is, with the total number of the HARQ processes not less than the amount of uplink subframe, SS 640 can transmit or retransmit data bursts with every uplink subframe using the plurality of HARQ processes. SS 640 also determines the subframe with global index $t_k$, with which the retransmission is transmitted, where $$t_k = k + N + \\ (D + N_{g1} + N_{g2} + N_{g3}) \times \left\lfloor \frac{N + [k - (D+N_{g1}+N_{g2})] \mod N_{frame}}{U} \right\rfloor. \quad (20)$$

Further, SS 640 determines a retransmission delay for an individual HARQ process, represented by $RT_k$, as the number of subframes from k+1 to the subframe in which the retransmission is scheduled:

$$RT_k = t_k - k = N + \\ (D + N_{g1} + N_{g2} + N_{g3}) \times \left\lfloor \frac{N + [k - (D+N_{g1}+N_{g2})] \mod N_{frame}}{U} \right\rfloor \quad (21)$$

SS 640 may also determine a feedback delay (ACK/NACK delay) as the number of subframes from k to $f_k - 1$, that is, the ACK/NACK delay from transmitting a data burst to receiving an ACK or NACK from BS 630. Since $f_k$ is already determined, the ACK/NACK delay $F_k$ can be represented by:

$$F_k = \max\{R_{bs} - 1 + w, R_{bs} + D'_{df} + 1\}, \quad (22)$$

where $D'_{df} = [(U+N_{g1}+N'_{g2}+N_{g3}) - (k+R_{bs}+1+U+N'_{g2}+N_{g3}) \mod (D'+U+N_{g1}+N'_{g2}+N_{g3})]$, $D' = D - (D-1) \mod N_{A\text{-}MAP}$, $N'_{g2} = N_{g2} + (D-1) \mod N_{A\text{-}MAP}$ $w=0$, if $D'_{df} > 0$; $w = (N_{A\text{-}MAP} + D'_{df}) \mod N_{A\text{-}MAP}$, if $D'_{df} \leq 0$.

After determining the various transmission, feedback, and retransmission timing parameters, BS 630 and/or SS 640 may use transmission, feedback, and retransmission timing to perform synchronous HARQ processing during communication.

The disclosure primarily addresses uplink HARQ transmission where a receiving station is a base station and a transmitting station is a subscriber station. This arrangement generally corresponds to 3GPP LTE and IEEE 802.16m, in which HARQ is based on synchronous retransmissions in the uplink path and asynchronous retransmissions in the downlink path. However, one of skill in the art will now appreciate that the disclosure also pertains to downlink HARQ transmission where a transmitting station is a base station and a receiving station is a subscriber station.

It will be apparent to those skilled in the art that various modifications and variations can be made in the system and method for operating synchronous HARQ between a subscriber station and base station in a TDD system. It is intended that the standard and examples be considered as exemplary only, with a true scope of the disclosed embodiments being indicated by the following claims and their equivalents.

What is claimed is:

1. A method of operating synchronous Hybrid Automatic Repeat Request (HARQ) between a transmitting station and a receiving station in a Time-Division Duplex (TDD) communication system, comprising:

configuring, at the transmitting station, a plurality of HARQ processes;

transmitting, via one of the plurality of HARQ processes and using a frame structure including a plurality of regions of subframes, a data burst in a first subframe to the receiving station;

receiving a second subframe transmitted from the receiving station and containing a HARQ feedback indicative of whether the data burst was correctly received at the receiving station;

determining whether the HARQ feedback is an acknowledgement (ACK) or a negative acknowledgement (NACK); and retransmitting, via the one of the plurality of HARQ processes, the data burst in a third subframe to the receiving station if it is determined that the HARQ feedback is a NACK, wherein a total number of the plurality of HARQ processes is determined based on a total number of uplink subframes between the first subframe and the third subframe; and wherein a time period between transmitting the first subframe by the transmitting station and transmitting the second subframe by the receiving station is determined by a processing delay of the receiving station, an A-MAP configuration, and the frame structure.

2. The method according to claim 1, wherein the transmitting station is a subscriber station (SS) and the receiving station is a base station (BS).

3. The method according to claim 1, wherein the plurality of regions of subframes include:

a downlink region of subframes including a number of downlink subframes used for downlink communication;

an uplink region of subframes including a number of uplink subframes used for unlink communication; and one or more reserved regions of subframes each including a number of subframes used for legacy zone or relay zone communication.

4. The method according to claim 1, wherein a time period between receiving the second subframe from the receiving station and transmitting the third subframe by the transmitting station is determined by processing delay of the transmitting station, the second subframe, and the frame structure.

5. The method according to claim 1, provided that i is a frame index, j is a subframe index, D is a total number of subframes in a downlink region of the frame structure, U is a total number of subframes in an uplink region of the frame structure, $N_{g1}$ is a total number of subframes in a first idle region of the frame structure, $N_{g2}$ is a total number of subframes in a second idle region of the frame structure, $N_{g3}$ is a total number of subframes in a third idle region of the frame structure, $R_{bs}$ is a processing delay of the receiving station, $N_{A-MAP}$ is an A-MAP configuration parameter, and $N_{frame}$ is a total number of subframes per frame, wherein $N_{frame} = D+U+N_{g1}+N_{g2}+N_{g3}$, the first subframe is represented by a global subframe index k and $k = i \times N_{frame}+j$, and the second subframe is represented by a global subframe index $f_k$ and $f_k = \max\{k+R_{bs}+1+w, k+R_{bs}+D'_{dl}+1\}$, wherein $D'_{dl} = [(U+N_{g1}+N'_{g2}+N_{g3}) - (k+R_{bs}+1+U+N'_{g2}+N_{g3}) \mod (D'+U+N_{g1}+N'_{g2}+N_{g3})]$, $D' = D-(D-1) \mod N_{A-MAP}$, $N'_{g2} = N_{g2}+(D-1) \mod N_{A-MAP}$, and $w=0$, if $D'_{dl}>0$; and $w=(N_{A-MAP}+D'_{dl}) \mod N_{A-MAP}$, if $D'_{dl} \leq 0$.

6. The method according to claim 5, further provided that $T_{ms}$ is a processing delay of the transmitting station, wherein the third subframe is represented by a global subframe index $rt_k$ and $rt_k = \max\{f_k+T_{ms}+1, f_k+T_{ms}+D_{ul}+1\}$, wherein $D_{ul} = \max\{0,(D+N_{g1}+N_{g2}+N_{g3}) - (f_k+T_{ms}+1+N_{g3}) \mod N_{frame}\}$.

7. The method according to claim 6, further provided that N is the total number of plurality of HARQ processes, and $N_k$ is a total number of uplink subframes between the first subframe and the third subframe frame, wherein $$N_k = rt_k - k - (D + N_{g1} + N_{g2} + N_{g3}) \times \left(\left\lfloor \frac{rt_k}{D+U+N_{g1}+N_{g2}+N_{g3}} \right\rfloor - \left\lfloor \frac{k}{D+U+N_{g1}+N_{g2}+N_{g3}} \right\rfloor\right),$$

and $N = \max\{N_k, \text{ for all } k = D+N_{g1}+N_{g2} \text{ to } D+U+N_{g1}+N_{g2}-1\}$.

8. The method according to claim 7, further provided that $RT_k$ is a retransmission delay defined as a total number of subframes between the first subframe and the third subframe, wherein $$RT_k = t_k - k = N + (D+N_{g1}+N_{g2}+N_{g3}) \times \left\lfloor \frac{N + [k-(D+N_{g1}+N_{g2})] \mod N_{frame}}{U} \right\rfloor.$$

9. A wireless communication station for wireless communication in a Time-Division Duplex (TDD) communication system using synchronous Hybrid Automatic Repeat Request (HARQ) between the wireless communication station and an external wireless device, the wireless communication station comprising:

at least one memory to store data and instructions; and at least one processor configured to access the memory and configured to, when executing the instructions:

configure a plurality of HARQ processes;

transmit, via one of the plurality of HARQ processes and using a frame structure including a plurality of regions of subframes, a data burst in a first subframe to the external wireless device;

receive a second subframe transmitted from the external wireless device and containing a HARQ feedback indicative of whether the data burst was correctly received at the external wireless device;

determine whether the HARQ feedback is an acknowledgement (ACK) or a negative acknowledgement (NACK); and retransmit, via the one of the plurality of HARQ processes, the data burst in a third subframe to the external wireless device if it is determined that the HARQ feedback is a NACK, wherein a total number of the plurality of HARQ processes is determined based on a total number of uplink subframes between the first subframe and the third subframe; and wherein a time period between transmitting the first subframe by the wireless communication station and transmitting the second subframe by the external wireless device is determined by a processing delay of the external wireless device, an A-MAP configuration, and the frame structure.

10. The wireless communication station according to claim 9, wherein the wireless communication station is a subscriber station (SS) and the external wireless device is a base station (BS).

11. The wireless communication station according to claim 9, wherein the plurality of regions of subframes include:
   a downlink region of subframes including a number of downlink subframes used for downlink communication;
   an uplink region of subframes including a number of uplink subframes used for unlink communication; and
   one or more reserved regions of subframes each including a number of subframes used for legacy zone or relay zone communication.

12. The wireless communication station according to claim 9, wherein a time period between receiving the second subframe from the external wireless device and transmitting the third subframe by the wireless communication station is determined by a processing delay of the wireless communication station, the second subframe, and the frame structure.

13. The wireless communication station according to claim 9, provided that i is a frame index, j is a subframe index, D is a total number of subframes in a downlink region of the frame structure, U is a total number of subframes in an uplink region of the frame structure, $N_{g1}$ is a total number of subframes in a first idle region of the frame structure, $N_{g2}$ is a total number of subframes in a second idle region of the frame structure, $N_{g3}$ is a total number of subframes in a third idle region of the frame structure, $R_{bs}$ is a processing delay of the external wireless device, $N_{A\text{-}MAP}$ is an A-MAP configuration parameter, and $N_{frame}$ is a total number of subframes per frame, wherein $$N_{frame}=D+U+N_{g1}+N_{g2}+N_{g3},$$

the first subframe is represented by a global subframe index k and $k=i\times N_{frame}+j$, and
the second subframe is represented by a global subframe index $f_k$ and $f_k=\max\{k+R_{bs}+1+w, k+R_{bs}+D'_{dl}+1\}$, wherein $$D'_{dl}=[(U+N_{g1}+N'_{g2}+N_{g3})-(k+R_{bs}+1+U+N'_{g2}+N_{g3}) \mod (D'+U+N_{g1}+N'_{g2}+N_{g3})],$$

$$D'=D-(D-1) \mod N_{A\text{-}MAP},$$

$$N'_{g2}=N_{g2}+(D-1) \mod N_{A\text{-}MAP}, \text{ and}$$

$w=0$, if $D'_{dl}>0$; and $w=(N_{A\text{-}MAP}+D'_{dl}) \mod N_{A\text{-}MAP}$, if $D'_{dl}\leq 0$.

14. The wireless communication station according to claim 13, further provided that $T_{ms}$ is a processing delay of the wireless communication station, wherein
the third subframe is represented by a global subframe index $rt_k$ and $rt_k=\max\{f_k+T_{ms}+1, f_k+T_{ms}+D_{ul}+1\}$, wherein $$D_{ul}=\max\{0,(D+N_{g1}+N_{g2}+N_{g3})-(f_k+T_{ms}+1+N_{g3}) \mod N_{frame}\}.$$

15. The wireless communication station according to claim 14, further provided that N is the total number of plurality of HARQ processes, and $N_k$ is a total number of uplink subframes between the first subframe and the third subframe, wherein $$N_k = rt_k - k - (D + N_{g1} + N_{g2} + N_{g3}) \times$$
$$\left(\left\lfloor \frac{rt_k}{D+U+N_{g1}+N_{g2}+N_{g3}} \right\rfloor - \left\lfloor \frac{k}{D+U+N_{g1}+N_{g2}+N_{g3}} \right\rfloor\right),$$

and $N = \max\{N_k, \text{ for all } k = D + N_{g1} + N_{g2} \text{ to } D + U + N_{g1} + N_{g2} - 1\}.$ 16. The wireless communication station according to claim 15, further provided that $RT_k$ is a retransmission delay defined as a total number of subframes between the first subframe and the third subframe, wherein $$RT_k = t_k - k =$$
$$N + (D + N_{g1} + N_{g2} + N_{g3}) \times \left\lfloor \frac{N + [k - (D + N_{g1} + N_{g2}) \mod N_{frame}]}{U} \right\rfloor.$$

* * * * *

UNITED STATES PATENT AND TRADEMARK OFFICE
CERTIFICATE OF CORRECTION

PATENT NO.         : 8,407,549 B2                                   Page 1 of 1
APPLICATION NO.    : 12/654906
DATED              : March 26, 2013
INVENTOR(S)        : Chun-Yuan Chiu It is certified that error appears in the above-identified patent and that said Letters Patent is hereby corrected as shown below:

In the Claims:

Claim 3, Col. 17, Line 32, "unlink" should read as --uplink--.

Claim 11, Col. 19, Line 10, "unlink" should read as --uplink--.

Signed and Sealed this
Thirteenth Day of August, 2013

Teresa Stanek Rea
*Acting Director of the United States Patent and Trademark Office*